US012750588B2

(12) United States Patent
Hommyo et al.

(10) Patent No.: US 12,750,588 B2
(45) Date of Patent: Sep. 29, 2026

(54) IMAGE PROCESSING APPARATUS, INSPECTION APPARATUS, REVIEW APPARATUS, IMAGE PROCESSING METHOD, INSPECTION METHOD, AND REVIEW METHOD

(71) Applicant: Lasertec Corporation, Yokohama (JP)

(72) Inventors: Takeharu Hommyo, Yokohama (JP); Ryuta Namise, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 0 days.

(21) Appl. No.: 18/962,859

(22) Filed: Nov. 27, 2024

(65) Prior Publication Data

US 2025/0184611 A1 Jun. 5, 2025

(30) Foreign Application Priority Data

Dec. 1, 2023 (JP) ................................ 2023-203994

(51) Int. Cl.
*H04N 23/71* (2023.01)
*H04N 23/81* (2023.01)

(52) U.S. Cl.
CPC ............ *H04N 23/71* (2023.01); *H04N 23/81* (2023.01)

(58) Field of Classification Search
CPC ........ H04N 23/71; H04N 23/81; G06T 7/001; G06T 5/40; G06T 7/10; G06T 2207/30108; G01N 21/88; G06F 17/18
See application file for complete search history.

(56) References Cited

U.S. PATENT DOCUMENTS

2006/0078191 A1 4/2006 Matsumura
2012/0314971 A1* 12/2012 Yuan ........................ G06T 5/94 382/274

(Continued)

FOREIGN PATENT DOCUMENTS

JP 2006098152 A 4/2006
JP 2021060209 A 4/2021

OTHER PUBLICATIONS

Taiwan Intellectual Property Office, Office Action Issued in Application No. 113144988, Jan. 16, 2026, 15 pages. (Submitted with English Translation Automated by an AI Translator).

(Continued)

*Primary Examiner* — Mekonnen D Dagnew
(74) *Attorney, Agent, or Firm* — McCoy Russell LLP

(57) ABSTRACT

An image processing apparatus according to the present embodiment includes an evaluation parameter acquisition unit configured to acquire an evaluation parameter for evaluating the information about each pixel of the plurality of pixels included in an evaluation image, based on comparison between a reference image and the evaluation image, the comparison being based on information about each pixel of a plurality of pixels included in the reference image and information about each pixel of a plurality of pixels included in the evaluation image corresponding to the reference image; a statistical value acquisition unit configured to acquire a statistical value of the evaluation parameters for a plurality of predetermined specific pixels in the evaluation image; and a standardized evaluation parameter acquisition unit configured to acquire a standardized evaluation parameter for evaluating the information about each pixel of the plurality of pixels included in the evaluation image.

15 Claims, 15 Drawing Sheets

100

(56) References Cited

U.S. PATENT DOCUMENTS

| | | | | |
|---|---|---|---|---|
| 2015/0091714 A1* | 4/2015 | Ono | G08G 1/165 | |
| | | | 340/435 | |
| 2017/0262974 A1* | 9/2017 | Kasahara | G06T 7/001 | |

OTHER PUBLICATIONS

Japanese Patent Office, Office Action Issued in Application No. 2023-203994, Nov. 4, 2025, 8 pages. (Submitted with Machine Translation).

Ministry of Intellectual Property, Office Action Issued in Application No. 10-2024-0172979, Jul. 23, 2026, South Korea, 17 pages. (Submitted with Machine Translation).

* cited by examiner

IMAGE PROCESSING APPARATUS, INSPECTION APPARATUS, REVIEW APPARATUS, IMAGE PROCESSING METHOD, INSPECTION METHOD, AND REVIEW METHOD

INCORPORATION BY REFERENCE

This application is based upon and claims the benefit of priority from Japanese patent application No. 2023-203994, filed on Dec. 1, 2023, the disclosure of which is incorporated herein in its entirety by reference for all purposes.

BACKGROUND

The present disclosure relates to an image processing apparatus, an inspection apparatus, a review apparatus, an image processing method, an inspection method, and a review method.

Japanese Unexamined Patent Application Publication No. 2021-060209 discloses an example of comparing a reference image and an inspection image of a specimen for defect detection of the specimen.

SUMMARY

For example, there has been a desire for highly accurate image processing with flattened noise achieved by inspection or the like that takes into consideration the magnitude of inspection noise caused by luminance difference and pattern difference.

The present disclosure has been made in view of such a problem and provides an image processing apparatus, an inspection apparatus, a review apparatus, an image processing method, an inspection method, and a review method that are capable of performing highly accurate image processing.

An image processing apparatus according to an aspect of the present embodiment includes: an evaluation parameter acquisition unit configured to acquire an evaluation parameter based on information about each pixel of a plurality of pixels included in a reference image and information about each pixel of a plurality of pixels included in an evaluation image corresponding to the reference image, the evaluation parameter being acquired as the information about each pixel of a plurality of pixels included in a comparison image corresponding to the reference image and the evaluation image; a statistical value acquisition unit configured to acquire a statistical value of the evaluation parameter for a plurality of predetermined specific pixels in the comparison image; a standardized evaluation parameter acquisition unit configured to acquire a standardized evaluation parameter as information about each pixel of the plurality of pixels included in a standardized image corresponding to the comparison image by standardizing the evaluation parameter of each pixel of the plurality of pixels included in the comparison image based on the statistical value; and an evaluation unit configured to evaluate the standardized evaluation parameter.

An image processing apparatus according to an aspect of the present embodiment includes: an evaluation parameter acquisition unit configured to acquire an evaluation parameter for evaluating the information about each pixel of the plurality of pixels included in an evaluation image, based on comparison between a reference image and the evaluation image, the comparison being based on information about each pixel of a plurality of pixels included in the reference image and information about each pixel of a plurality of pixels included in the evaluation image corresponding to the reference image; a statistical value acquisition unit configured to acquire a statistical value of the evaluation parameters for a plurality of predetermined specific pixels in the evaluation image; a standardized evaluation parameter acquisition unit configured to acquire a standardized evaluation parameter for evaluating the information about each pixel of the plurality of pixels included in the evaluation image by standardizing the evaluation parameter based on the statistical value; and an evaluation unit configured to evaluate the standardized evaluation parameter.

In the above-described image processing apparatus, the evaluation parameter acquisition unit may acquire, as the evaluation parameter of each pixel, a difference value obtained by comparing luminance of each pixel in the reference image with the luminance of each pixel in the evaluation image.

In the above-described image processing apparatus, the specific pixels may include at least one of the pixels whose luminance in the reference image belongs to a specific luminance range and the pixels whose luminance in the evaluation image belongs to the specific luminance range.

In the above-described image processing apparatus, the statistical value acquisition unit acquires a specific statistical value of the evaluation parameter for the specific pixels corresponding to the pixels belonging to the specific luminance range, and the standardized evaluation parameter acquisition unit acquires the standardized evaluation parameter by standardizing the evaluation parameters of the specific pixels based on the specific statistical value.

In the above-described image processing apparatus, the statistical value acquisition unit divides the specific luminance range into a plurality of specific luminance range parts, divides the specific pixels into a plurality of specific pixel parts corresponding to the pixel parts belonging to the respective luminance range parts, and acquires, for each specific pixel part, a specific statistical value part that is a statistical value of the evaluation parameter for the specific pixel parts, and the standardized evaluation parameter acquisition unit acquires the standardized evaluation parameter for the pixels corresponding to each specific pixel part by standardizing the evaluation parameter of each specific pixel part based on each specific statistical value part.

In the above-described image processing apparatus, at least one of the reference image and the evaluation image includes an image of a specimen having a pattern, and the specific pixels include at least one pixel among the pixels corresponding to the pixels belonging to specific regions partitioned based on the pattern in the reference image and the pixels corresponding to the pixels belonging to the specific regions partitioned based on the pattern in the evaluation image.

In the above-described image processing apparatus, the statistical value acquisition unit acquires a specific statistical value of the evaluation parameter for the specific pixels corresponding to the pixels belonging to the specific regions, and the standardized evaluation parameter acquisition unit acquires the standardized evaluation parameter by standardizing the evaluation parameters of In the above-described image processing apparatus, the statistical value acquisition unit divides the specific regions into a plurality of specific region parts, divides the specific pixels into a plurality of specific pixel parts corresponding to the pixel parts belonging to the respective specific region parts, and acquires, for each specific pixel part, a specific statistical value part that is a statistical value of the evaluation parameter for the specific pixel parts, and the standardized evaluation parameter acquisition unit acquires the standardized evaluation parameter for the pixels corresponding to each specific pixel part by standardizing the evaluation parameter of each specific pixel part based on each specific statistical value part.

In the above-described image processing apparatus, the evaluation unit may perform at least one of evaluation of error existence for a subject specimen in the evaluation image based on comparison between the standardized evaluation parameter and a predetermined threshold value, evaluation of, for the pixel, a correction aspect to be performed on the evaluation image based on the standardized evaluation parameter, and evaluation of error existence for a corrected image obtained by correcting the evaluation image based on the standardized evaluation parameter.

The above-described image processing apparatus may further include a processing unit configured to acquire a processed value through arithmetic processing based on the standardized evaluation parameter and the evaluation parameter, and the evaluation unit may evaluate the processed value.

An inspection apparatus according to an aspect of the present embodiment includes the above-described image processing apparatus and inspects a subject specimen in the evaluation image.

A review apparatus according to an aspect of the present embodiment includes the above-described image processing apparatus, and a monitor for reviewing the reference image, the evaluation image, the comparison image, and the standardized image.

An image processing method according to an aspect of the present embodiment includes: acquiring an evaluation parameter based on information about each pixel of a plurality of pixels included in a reference image and information about each pixel of a plurality of pixels included in an evaluation image corresponding to the reference image, the evaluation parameter being acquired as the information about each pixel of a plurality of pixels included in a comparison image corresponding to the reference image and the evaluation image; acquiring a statistical value of the evaluation parameter for a plurality of predetermined specific pixels in the comparison image; acquiring a standardized evaluation parameter by standardizing the evaluation parameter of each pixel of the plurality of pixels included in the comparison image based on the statistical value, the standardized evaluation parameter being acquired as information about each pixel of the plurality of pixels included in a standardized image corresponding to the comparison image; and evaluating the standardized evaluation parameter.

An image processing method according to an aspect of the present embodiment includes: acquiring an evaluation parameter based on comparison between a reference image and an evaluation image for evaluating the information about each pixel of the plurality of pixels included in the evaluation image, the comparison being based on information about each pixel of a plurality of pixels included in the reference image and information about each pixel of a plurality of pixels included in the evaluation image corresponding to the reference image; acquiring a statistical value of the evaluation parameter for a plurality of predetermined specific pixels in the evaluation image; acquiring a standardized evaluation parameter for evaluating the information about each pixel of the plurality of pixels included in the evaluation image by standardizing the evaluation parameter based on the statistical value; and evaluating the standardized evaluation parameter.

An inspection method according to an aspect of the present embodiment includes the above-described image processing method and inspects a subject specimen in the evaluation image.

A review method according to an aspect of the present embodiment includes the above-described image processing method and reviewing the reference image, the evaluation image, the comparison image, and the standardized image with a monitor.

According to the present disclosure, it is possible to provide an image processing apparatus, an inspection apparatus, a review apparatus, an image processing method, an inspection method, and a review method that are capable of performing highly accurate image processing.

The above and other objects, features and advantages of the present disclosure will become more fully understood from the detailed description given hereinbelow and the accompanying drawings.

DESCRIPTION OF EMBODIMENTS

Embodiments of the present disclosure will be described below with reference to the accompanying drawings. The description below presents preferable embodiments of the present disclosure, and the scope of the present disclosure is not limited to the embodiments below. In the following description, those denoted by the same reference sign correspond to contents that are the same in effect.

Embodiment 1

An image processing apparatus and an image processing method according to Embodiment 1 will be described below. The image processing apparatus of the present embodiment may be applied to an inspection apparatus that inspects a specimen defect or the like as well as to a review apparatus that displays a specimen image. Specifically, the image processing apparatus of the present embodiment may be connected to or incorporated in the inspection apparatus. The image processing apparatus of the present embodiment may be connected to or incorporated in the review apparatus. The inspection apparatus may include an image correction apparatus, a review apparatus, and a storage apparatus. The review apparatus may include an image correction apparatus, an inspection apparatus, and a storage apparatus. An image processing apparatus 40 performs image processing of an image input to an image correction apparatus, an image detected by an inspection apparatus, an image stored in a storage apparatus, and the like.

Figure 1:
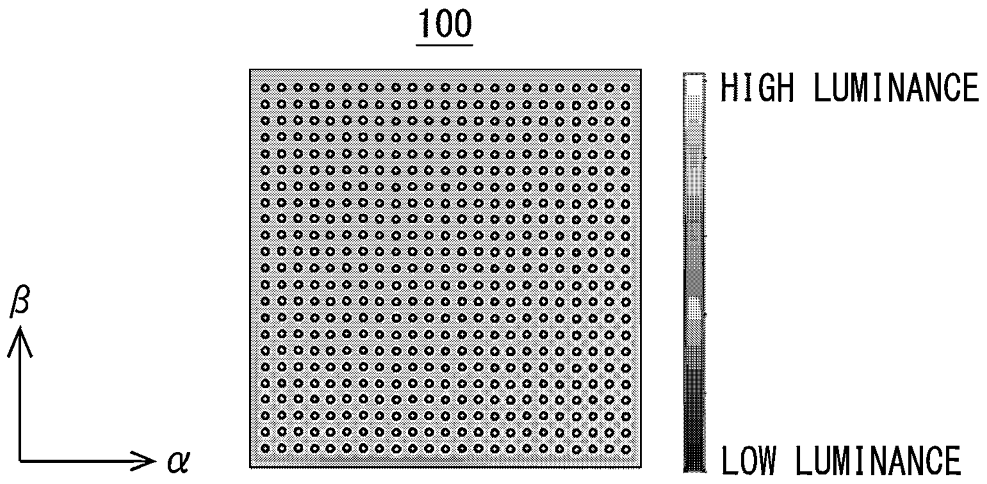
FIG. 1 is a plan view exemplarily illustrating a reference image processed by an image processing apparatus according to Embodiment 1.
Figure 2:
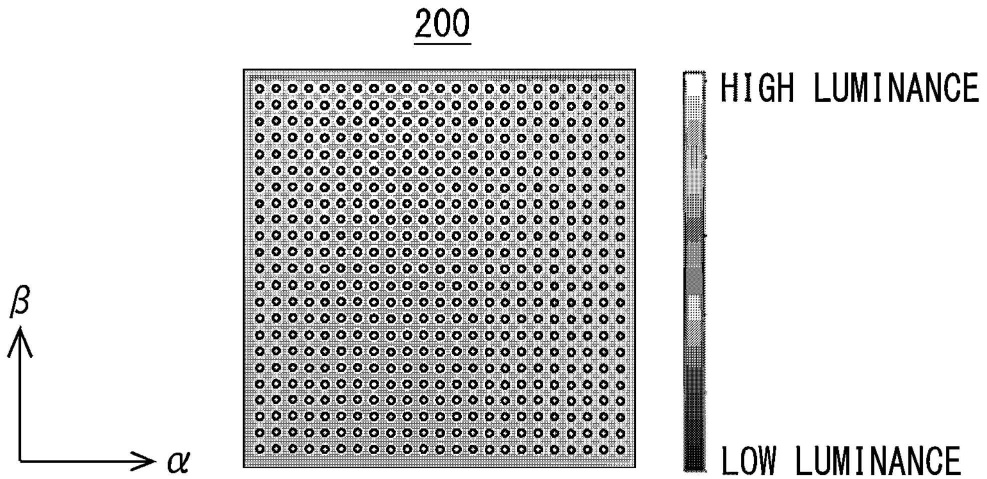
FIG. 2 is a plan view exemplarily illustrating an evaluation image processed by the image processing apparatus according to Embodiment 1.
Figure 3:
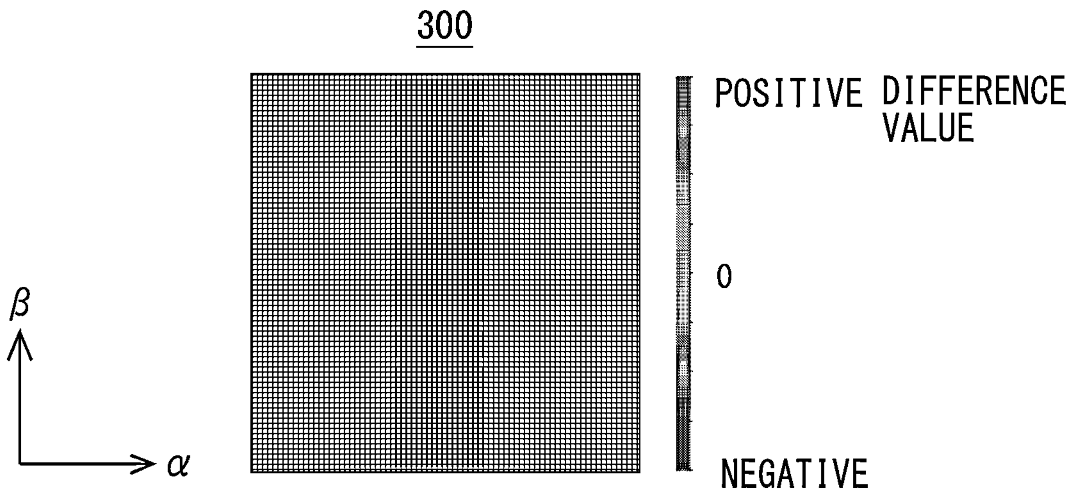
FIG. 3 is a plan view exemplarily illustrating a difference image as a comparison image processed by the image processing apparatus according to Embodiment 1.

FIGS. 1 to 3 are plan views exemplarily illustrating images processed by the image processing apparatus according to Embodiment 1. FIG. 1 illustrates a reference image 100. FIG. 2 illustrates an evaluation image 200. FIG. 3 illustrates a difference image 300 as a comparison image. As illustrated in FIGS. 1 to 3, the image processing apparatus performs image processing of the reference image 100, the evaluation image 200, and the difference image 300 as the comparison image.

Reference Image

The reference image 100 includes an image that serves as a reference in a case where an image capturing target specimen is inspected from an image, a case in which an image is corrected, or the like. The reference image 100 may be, for example, an image that captures a specimen as a reference, or an image that captures a predetermined region of a specimen as a review and inspection target. Alternatively, the reference image 100 may be an image as a reference based on design data. For example, in a case where one of masks and the other mask are inspected by comparison, the reference image 100 may be an image of the one mask. For example, in a case where the k-th and (k+1)-th dies of a mask formed with a plurality of dies including first to n-th dies are inspected by comparison, the reference image 100 may be an image including the k-th die.

The reference image 100 may be a partial region of an image that is larger than the reference image 100 and includes the reference image 100. For example, the reference image 100 may be a part corresponding to the k-th die in a mask image that captures a plurality of dies including first to n-th dies.

The reference image 100 includes a plurality of pixels arrayed in a matrix, for example. In the reference image 100, one direction in which the pixels are arrayed is referred to as an α-axis direction, and a direction intersecting the α-axis direction is referred to as a β-axis direction. The reference image 100 may include a plurality of pixels on L rows arrayed in the α-axis direction and M columns arrayed in the β-axis direction. Each pixel of the reference image 100 has information about the pixel. The information about each pixel in the reference image 100 includes, for example, the luminance of the pixel. Note that "each pixel" may mean all pixels included in an image or may mean some pixels (a plurality of pixels) among all pixels included in the image.

In the present specification, the expression "each pixel" is used with either meaning unless otherwise stated.

Evaluation Image

The evaluation image 200 includes a target image in a case where an image capturing target specimen is inspected from an image, a case where an image is corrected, or the like. The evaluation image 200 may be, for example, an image that captures a target specimen, or an image that captures a predetermined region of a specimen as a review or inspection target. Alternatively, the evaluation image 200 may be a target image based on design data. For example, in a case where one of masks and the other mask are inspected by comparison, the evaluation image 200 may be an image of the other mask. For example, in a case where the k-th and (k+1)-th dies of a mask formed with a plurality of dies including first to n-th dies are inspected by comparison, the evaluation image 200 may be an image including the (k+1)-th die.

The evaluation image 200 may be a partial region of an image that is larger than the evaluation image 200 and includes the evaluation image 200. For example, the evaluation image 200 may be a part corresponding to the (k+1)-th die in a mask image that captures a plurality of dies including first to n-th dies.

The evaluation image 200 includes a plurality of pixels arrayed in a matrix, for example. The evaluation image 200 may include a plurality of pixels on L rows arrayed in the α-axis direction and M columns arrayed in the β-axis direction. Each pixel of the evaluation image 200 has information about the pixel. The information about each pixel in the evaluation image 200 includes, for example, the luminance of the pixel.

The evaluation image 200 corresponds to the reference image 100. For example, a plurality of pixels included in the evaluation image 200 correspond to a plurality of pixels included in the reference image 100, respectively. In other words, the pixels in the evaluation image 200 can be compared with the respective pixels in the reference image 100. Specifically, for example, the reference image 100 and the evaluation image 200 each include a plurality of pixels arrayed in a matrix of L rows in the a-axis direction and M columns in the β-axis direction. Note that well-known means such as positioning by using alignment marks may be used for correspondence between the pixels in the evaluation image 200 and the pixels in the reference image 100. A plurality of pixels in a predetermined region of the reference image 100 may correspond to a plurality of pixels in a predetermined region of the evaluation image 200. The information about each pixel in the evaluation image 200 can be calculated with the information about each pixel in the reference image 100. For example, a difference value (or ratio value) between the luminance of each pixel in the evaluation image 200 and the luminance of each pixel in the reference image 100 can be calculated. Such comparison value between the luminance of each pixel in the evaluation image 200 and the luminance of each pixel in the reference image 100 can be used to evaluate information about each pixel in the evaluation image 200. Thus, comparison value such as the difference value and ratio value may become the evaluation parameter, explained hereafter, for evaluating the information about pixels in the evaluation image 200.

Comparison Image (Difference Image)

The comparison image includes a plurality of pixels arrayed in a matrix, for example. The comparison image corresponds to the reference image 100 and the evaluation image 200. Similarly to the reference image 100 and the evaluation image 200, the comparison image may include a plurality of pixels on L rows arrayed in the α-axis direction and M columns arrayed in the β-axis direction. Each pixel in the comparison image has information about the pixel. For example, each pixel in the comparison image may have an evaluation parameter as the information about the pixel. The evaluation parameter is obtained based on the information about each pixel in the evaluation image 200 and the information about each pixel in the reference image 100.

The comparison image corresponds to the reference image 100 and the evaluation image 200. For example, the plurality of pixels included in the comparison image correspond to the plurality of pixels included in the reference image 100 and the plurality of pixels included in the evaluation image 200, respectively.

The comparison image may include the difference image 300. The difference image 300 includes a plurality of pixels arrayed in a matrix. The difference image 300 corresponds to the reference image 100 and the evaluation image 200. Similarly to the comparison image, the difference image 300 may include a plurality of pixels on L rows arrayed in the α-axis direction and M columns arrayed in the β-axis direction. Each pixel in the difference image 300 has information about the pixel. Each pixel in the difference image 300 has a difference value as the information about the pixel. The difference value is the difference between the luminance of each pixel in the evaluation image 200 and the luminance of each pixel in the reference image 100. Accordingly, the evaluation parameter of each pixel in the difference image 300 (comparison image) includes the difference value between the luminance of each pixel in the evaluation image 200 and the luminance of each pixel in the reference image 100.

Note that the comparison image is not limited to the difference image 300, and the evaluation parameter is not limited to the difference value. For example, the evaluation parameter of each pixel in the comparison image may include a ratio of the luminance of each pixel in the evaluation image 200 and the luminance of each pixel in the reference image 100. Note that the comparison image may be a virtual image for convenience of description of processing for inspecting an image capturing target specimen from the evaluation image 200 and processing for correcting the evaluation image 200. It is not essential that the comparison image is displayed on a display apparatus or the like, nor that the comparison image is generated as an image. Thus, the evaluation parameters of pixels included in the comparison image are also simply referred to mean "evaluation parameters for the plurality of pixels included in the evaluation image 200 (evaluation parameters for evaluating the information about the plurality of pixels included in the evaluation image 200) based on comparison between the reference image 100 and the evaluation image 200" or simply referred to mean "evaluation parameters for the plurality of pixels included in the evaluation image 200". In addition, "evaluation parameters for the plurality of pixels included in the evaluation image 200 based on comparison between the reference image 100 and the evaluation image 200" and "evaluation parameters for the plurality of pixels included in the evaluation image 200" are also described as information (evaluation parameters) about pixels included in the comparison image, for sake of simplicity.

Image Processing Apparatus

Figure 4:
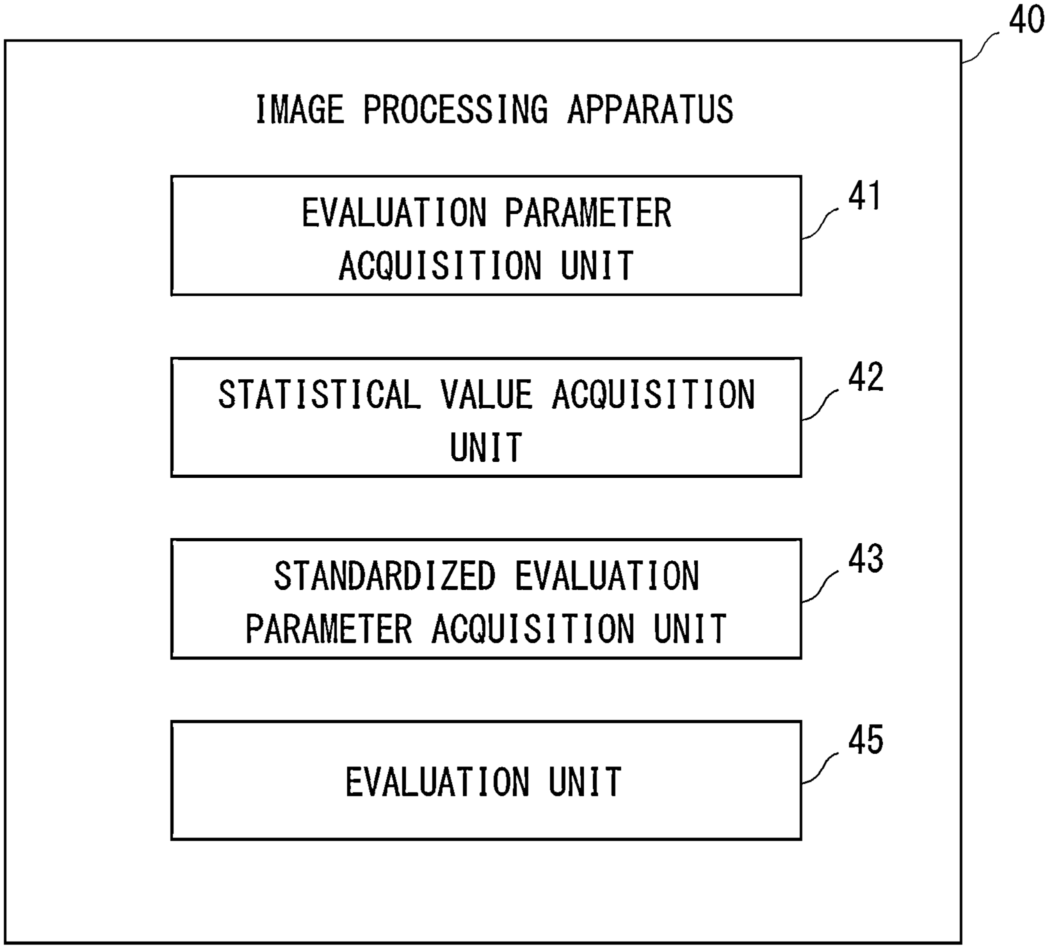
FIG. 4 is a block diagram exemplarily illustrating the image processing apparatus according to Embodiment 1.

FIG. 4 is a block diagram exemplarily illustrating the image processing apparatus 40 according to Embodiment 1. As illustrated in FIG. 4, the image processing apparatus 40 includes an evaluation parameter acquisition unit 41, a statistical value acquisition unit 42, a standardized evaluation parameter acquisition unit 43, and an evaluation unit 45. The evaluation parameter acquisition unit 41, the statistical value acquisition unit 42, the standardized evaluation parameter acquisition unit 43, and the evaluation unit 45 have functions of an evaluation parameter acquisition means, a statistical value acquisition means, a standardized evaluation parameter acquisition means, and an evaluation means, respectively.

Figure 5:
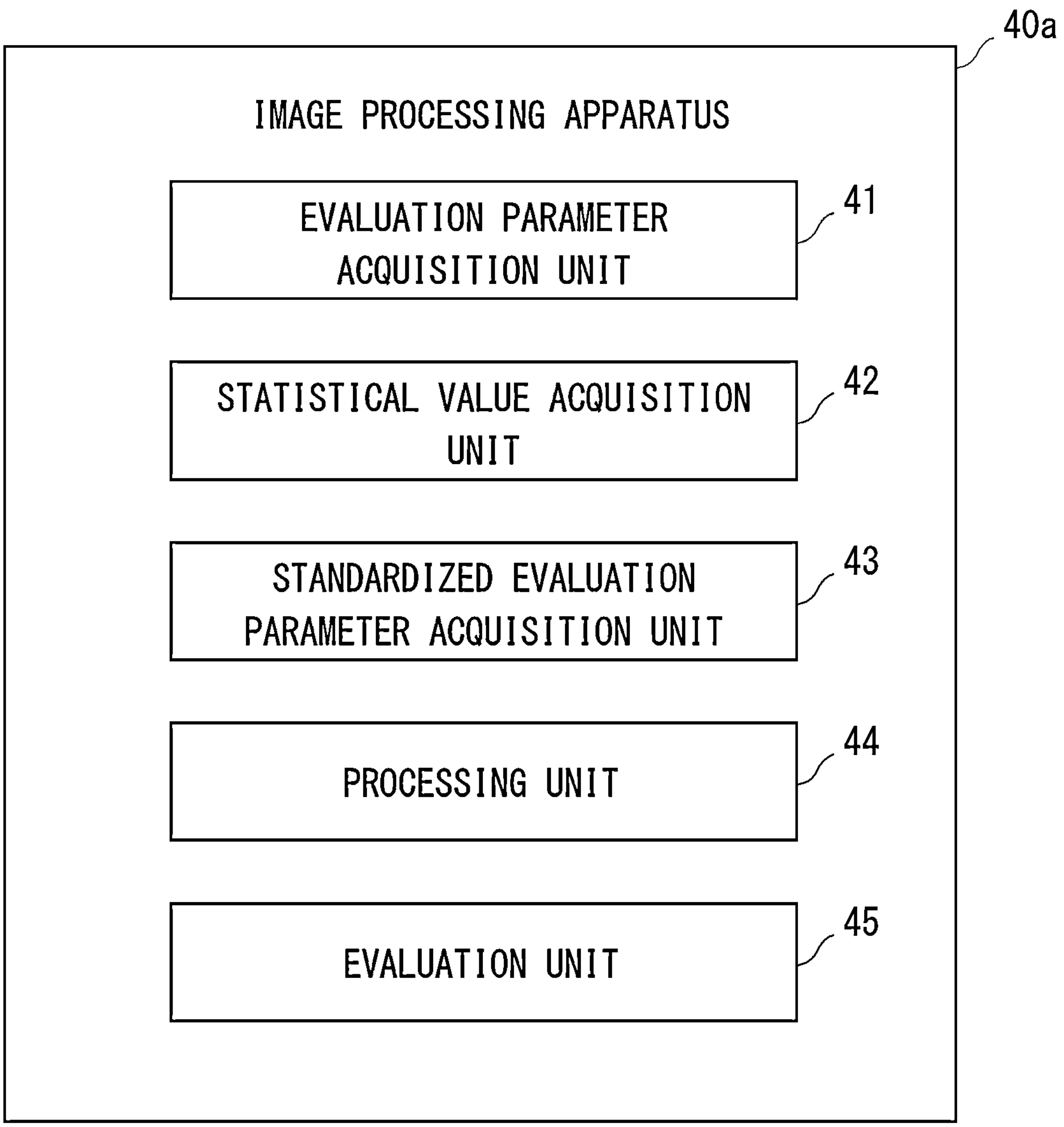
FIG. 5 is a block diagram exemplarily illustrating an image processing apparatus according to another example of Embodiment 1.

FIG. 5 is a block diagram exemplarily illustrating an image processing apparatus 40*a* according to another example of Embodiment 1. As illustrated in FIG. 5, the image processing apparatus 40*a* may include a processing unit 44 in addition to the image processing apparatus 40. The processing unit 44 has functions of a processing means.

Evaluation Parameter Acquisition Unit

The evaluation parameter acquisition unit 41 acquires the evaluation parameter based on the information about each pixel of the plurality of pixels included in the reference image 100 and the information about each pixel of the plurality of pixels included in the evaluation image 200, the evaluation parameter being acquired as the information about each pixel of the plurality of pixels included in the comparison image. The evaluation image 200 corresponds to the reference image 100, and the comparison image corresponds to the reference image 100 and the evaluation image 200. Accordingly, the evaluation image 200 includes a plurality of pixels corresponding to the plurality of pixels in the reference image 100. The comparison image includes a plurality of pixels corresponding to the plurality of pixels in the reference image 100 and the evaluation image 200.

In other words, the evaluation parameter acquisition unit 41 acquires the evaluation parameter for the plurality of pixels included in the comparison image based on the information about the pixels in the reference image 100 and the information about the pixels in the evaluation image 200, the comparison image being obtained based on the reference image 100 and the evaluation image 200 corresponding to the reference image 100.

Specifically, the evaluation parameter acquisition unit 41 acquires the difference value as the evaluation parameter of each pixel in the difference image 300 as the comparison image by comparison between the luminance of each pixel in the reference image 100 and the luminance of each pixel in the evaluation image 200. In this manner, the evaluation parameter acquisition unit 41 acquires the difference image 300 based on the reference image 100 and the evaluation image 200. The evaluation parameter may be used to evaluate information about pixel in the evaluation image 200. In other words, each evaluation parameter, which is information about each pixel in the comparison image, may be used to evaluate information about the corresponding pixel in the evaluation image 200.

Statistical Value Acquisition Unit

The statistical value acquisition unit 42 acquires a statistical value of the evaluation parameter for a plurality of predetermined specific pixels in the comparison image (The statistical value acquisition unit 42 may acquires a statistical value of the evaluation parameter of a plurality of predetermined specific pixels in the evaluation image 200). Specifically, the statistical value acquisition unit 42 acquires a statistical value of the difference value for a plurality of predetermined specific pixels in the difference image 300 (the statistical value acquisition unit 42 may acquire a statistical value of the difference value for evaluating the luminance of the plurality of predetermined specific pixels in the evaluation image 200).

The specific pixels in the comparison image or the specific pixels in the evaluation image 200 include at least one pixel among pixels corresponding to pixels whose luminance in the reference image 100 belongs to a specific luminance range and pixels corresponding to pixels whose luminance in the evaluation image 200 belongs to the specific luminance range. For example, the specific luminance range may include a range in which the pixel luminance is 30 to 150. In this case, the specific pixels include a pixel corresponding to a pixel having luminance in the range of 30 to 150 in the reference image 100 or the evaluation image 200. The statistical value acquisition unit 42 acquires a statistical value of the evaluation parameters for the specific pixels corresponding to the pixels belonging to the luminance range of 30 to 150. The statistical value of the evaluation parameter for the specific pixels is also referred to as a specific statistical value.

The statistical value acquisition unit 42 may divide the specific luminance range into a plurality of luminance range parts. The statistical value acquisition unit 42 may divide specific pixels into a plurality of specific pixel parts belonging to the respective luminance range parts. The statistical value acquisition unit 42 acquires, for each specific pixel part, a specific statistical value part that is a statistical value of the evaluation parameter for the specific pixel parts. Specifically, for example, the statistical value acquisition unit 42 may divide the luminance range of 30 to 150 into a plurality of luminance range parts each having the luminance range of ±1. In this case, the specific luminance range includes the luminance range of 30 to 150. The luminance range parts include 120 luminance range parts each having the corresponding central luminance of 30 to 150. Each luminance range part has a width of three luminances (central luminance−1, central luminance, and central luminance+1). Note that the luminance range and the luminance range parts are not limited to the above-described luminances but may be selected as appropriate.

The statistical value of the evaluation parameter includes the average value of the evaluation parameters and the standard deviation of the evaluation parameters. The average value of the evaluation parameters may include the average value of the evaluation parameters for the specific pixels or may include the average value of the evaluation parameters for the specific pixel parts. The standard deviation of the evaluation parameter may include the standard deviation of the evaluation parameters for the specific pixels or may include the standard deviation of the evaluation parameters for the specific pixel parts. Where the evaluation parameter is the difference value, the statistical value of the difference value includes the average value of the difference values and the standard deviation of the difference values. The average value of the difference values may include the average value of the difference values for the specific pixels or may include the average value of the difference values for the specific pixel parts. The standard deviation of the difference values may include the standard deviation of the difference values for the specific pixels or may include the standard deviation of the difference values for the specific pixel parts.

Figure 6:
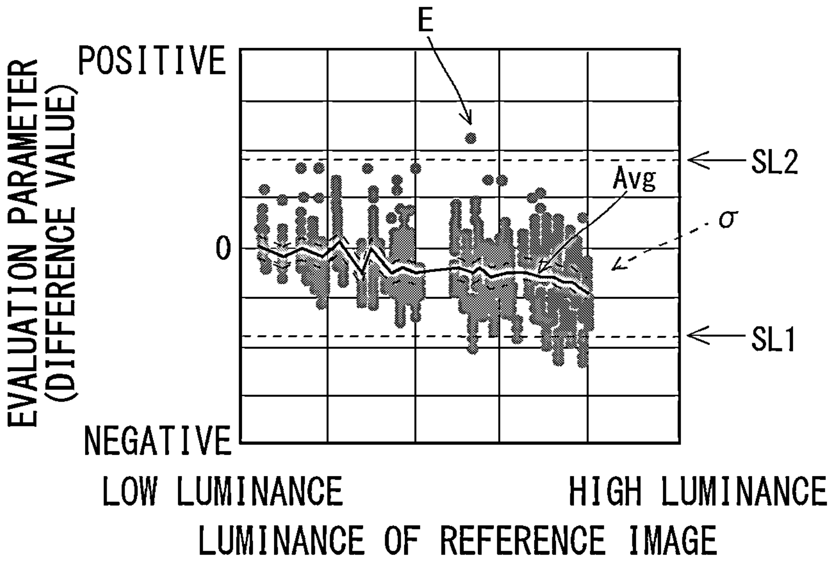
FIG. 6 is a graph exemplarily illustrating the relation between pixel information and an evaluation parameter in the image processing apparatus according to Embodiment 1, with the horizontal axis representing the pixel luminance of the reference image and the vertical axis representing a difference value as the evaluation parameter.

FIG. 6 is a graph exemplarily illustrating the relation between the pixel information and the evaluation parameter in the image processing apparatus 40 according to Embodiment 1, with the horizontal axis representing the pixel luminance of the reference image 100 and the vertical axis representing the difference value as the evaluation parameter. Note that the horizontal axis may represent the pixel luminance of the evaluation image 200. Whether the horizontal axis represents the pixel luminance of the reference image 100 or the pixel luminance of the evaluation image 200 may be determined based on a predetermined condition. For example, either of the pixel luminance of the reference image 100 and the pixel luminance of the evaluation image 200, with which the difference value of a defect or the like is easily visually understandable, may be used. As illustrated in FIG. 6, the statistical value acquisition unit 42 acquires the average value Avg of the difference values and the standard deviation a of the difference values for each luminance range part in a range with a pixel luminance width of ±1, for example.

In FIG. 6, threshold values SL1 and SL2 may be set for the evaluation parameter. The evaluation parameter in the range of the threshold values SL1 to SL2 may be considered normal, and the evaluation parameter smaller than the threshold value SL1 or larger than the threshold value SL2 may be considered abnormal. In this case, for example, point E in FIG. 6 indicates abnormal.

In FIG. 6, points smaller than the threshold value SL1 exist in a region where the pixel luminance of the reference image 100 is high. For example, high-sensitivity inspection has been requested along with photomask pattern miniaturization. Due to such increase in inspection sensitivity, threshold values for defect detection have approached noise level. The noise level is low in regions where the pixel luminance is low as compared to regions where the pixel luminance is high. Conversely, the noise level in regions where the pixel luminance is high is higher than in regions where the luminance is low. Thus, due to variation of the noise level, it is expected that in regions where the pixel luminance is high, points smaller than the threshold value SL1 will be detected as pseudo-defects more frequently. For example, it is expected that as the sensitivity of the review or the inspection apparatus that captures the evaluation image 200 increases, slight defocus attributable to the apparatus causes an increase in the detection of pseudo-defect.

To suppress detection of such pseudo-defects, threshold values may be set for each luminance range part. For example, a threshold value for regions where the pixel luminance is low may be set larger (its absolute value may be set smaller) than the threshold value SL1, and a threshold value for regions where the pixel luminance is high may be set smaller (its absolute value may be larger) than the threshold value SL1. However, it is cumbersome to set threshold values for each luminance range part, and it is difficult to make fine setting.

Standardized Image

Figure 7:
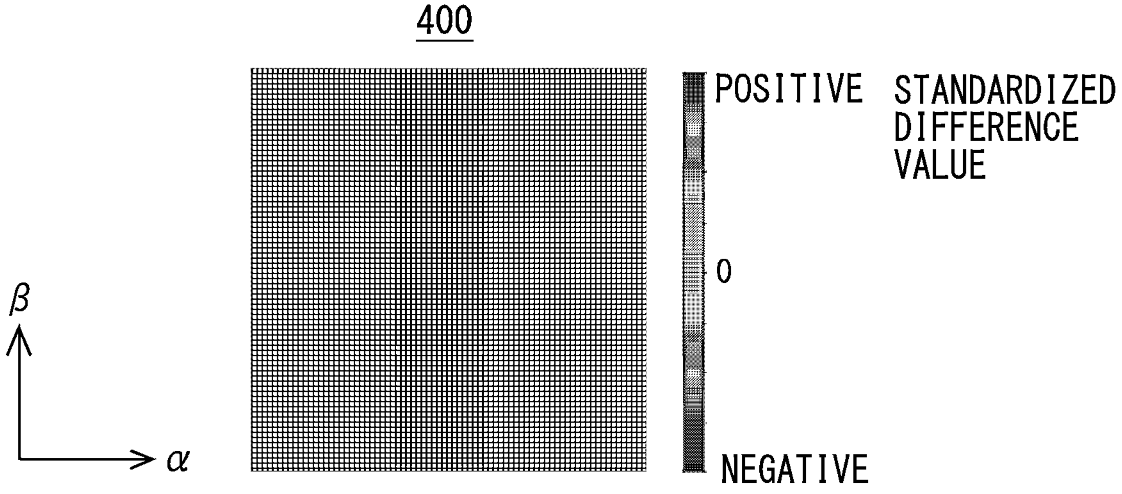
FIG. 7 is a plan view exemplarily illustrating a standardized image processed by the image processing apparatus according to Embodiment 1.

FIG. 7 is a plan view exemplarily illustrating a standardized image 400 processed by the image processing apparatus 40 according to Embodiment 1. As illustrated in FIG. 7, the standardized image 400 includes a plurality of pixels arrayed in a matrix, for example. The standardized image 400 corresponds to the reference image 100, the evaluation image 200, the comparison image, and the difference image 300. Similarly to the reference image 100, the evaluation image 200, the comparison image, and the difference image 300, the standardized image 400 may include a plurality of pixels on L rows arrayed in the α-axis direction and M columns arrayed in the β-axis direction. Each pixel in the standardized image 400 has information about the pixel. Each pixel in the standardized image 400 has a standardized evaluation parameter as information about the pixel. The standardized evaluation parameter is obtained by standardizing the evaluation parameter of each pixel in the comparison image. Specifically, the standardized evaluation parameter of each pixel in the standardized image 400 includes a standardized difference value obtained by standardizing the difference value of each pixel in the difference image 300. The standardized evaluation parameter may be obtained by standardizing the evaluation parameter of each pixel in the evaluation image 200. Specifically, the standardized evaluation parameter of each pixel in the standardized image 400 includes a standardized evaluation value obtained by standardizing the evaluation value for evaluating information about the pixel of each pixel in the evaluation image 200.

Since the standardized image 400 corresponds to the reference image 100, the evaluation image 200, and the comparison image, for example, the plurality of pixels included in the standardized image 400 may correspond to the plurality of pixels included in the reference image 100, the plurality of pixels included in the evaluation image 200, and the plurality of pixels included in the comparison image, respectively. Note that the standardized image 400 may be a virtual image for convenience of description of processing for inspecting an image capturing target specimen from the evaluation image 200 and processing for correcting the evaluation image 200, and it is not essential that the standardized image 400 is displayed on a display apparatus or the like, nor that the standardized image 400 is generated as an image. Thus, the standardized evaluation parameters of pixels included in the standardized image 400 are also simply referred to mean "standardized evaluation parameters obtained by standardizing the evaluation parameters" or simply referred to mean "standardized evaluation parameters obtained by standardizing the evaluation parameters for the plurality of pixels included in the evaluation image 200 (standardized evaluation parameters obtained by standardizing the evaluation parameters for evaluating the information about the plurality of pixels included in the evaluation image 200)". In addition, "standardized evaluation parameters obtained by standardizing the evaluation parameters" and "standardized evaluation parameters obtained by standardizing the evaluation parameters for evaluating the plurality of pixels included in the evaluation image 200" are also described as the information about pixels included in the standardized image 400 (standardized evaluation parameters of pixels included in the standardized image 400) for sake of simplicity.

Standardized Evaluation Parameter Acquisition Unit

The standardized evaluation parameter acquisition unit 43 acquires the standardized evaluation parameter by standardizing the evaluation parameter of each pixel of the plurality of pixels included in the comparison image based on the statistical value. The standardized evaluation parameter acquisition unit 43 may acquire the standardized evaluation parameter by standardizing the evaluation parameter for evaluating the information about each pixel of the plurality of pixels included in the evaluation image 200. The standardized evaluation parameter is then used as the information about of each pixel of the plurality of pixels included in the standardized image 400. In other words, the standardized evaluation parameter acquisition unit 43 acquires the standardized evaluation parameter by standardizing the evaluation parameter for the plurality of pixels in the comparison image based on the statistical value (or acquires the standardized evaluation parameter by standardizing the evaluation parameter for evaluating the information about the plurality of pixels in the evaluation image 200 based on the statistical value). Specifically, the standardized evaluation parameter acquisition unit 43 acquires the standardized difference value obtained by standardizing the difference value of each pixel in the difference image 300 based on the statistical value (or acquires the standardized difference value obtained by standardizing the difference value, which is the evaluating parameter for evaluating the luminance of each pixel in the evaluation image 200).

Figure 8:
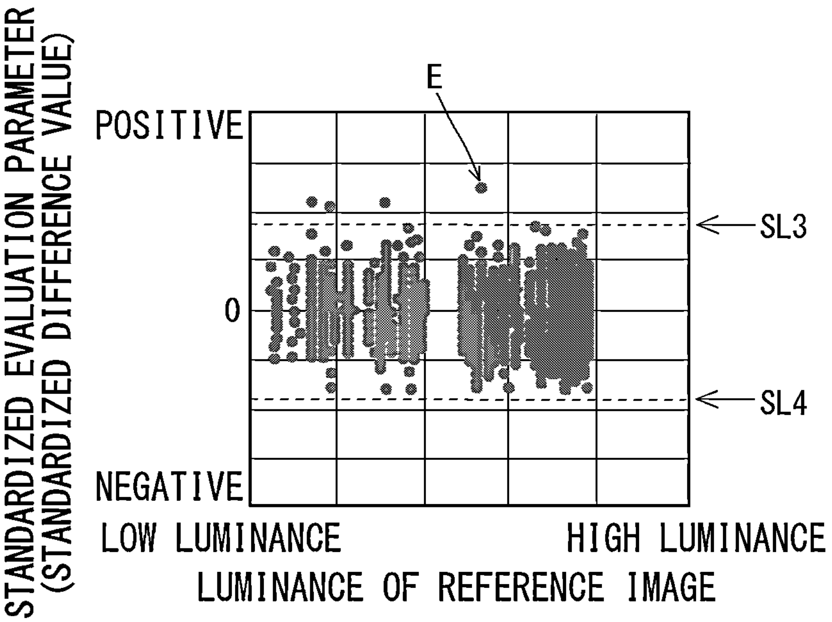
FIG. 8 is a graph exemplarily illustrating the relation between pixel information and a standardized evaluation parameter in the image processing apparatus according to Embodiment 1, with the horizontal axis representing the pixel luminance of the reference image and the vertical axis representing a standardized difference value.

FIG. 8 is a graph exemplarily illustrating the relation between the pixel information and the standardized evaluation parameter in the image processing apparatus 40 according to Embodiment 1, with the horizontal axis representing the pixel luminance of the reference image 100 and the vertical axis representing the standardized difference value. As illustrated in FIG. 8, the standardized evaluation parameter acquisition unit 43 acquires the standardized evaluation parameter by standardizing the evaluation parameter of each specific pixel based on the specific statistical value of the evaluation parameters of pixels that are the specific pixels. The standardized evaluation parameter acquisition unit 43 acquires the standardized evaluation parameter as the information about each pixel, in the standardized image 400, corresponding to the specific pixel part by standardizing the evaluation parameter of the specific pixel part based on each specific statistical value part. Specifically, the standardized evaluation parameter acquisition unit 43 acquires the standardized evaluation parameter based on Expression (1) below. This is done by using the average value (Ave) and the standard deviation (σ) of the evaluation parameters. These statistical values may be referred to as the specific statistical value part, as they are acquired for each specific pixel part that belongs to one of the multiple luminance range parts, each with a luminance range of ±1 around a central luminance within the specific luminance range of 30 to 150.

$$StdPara_i=(Para_i-Avg_i)/\sigma_i \quad (1)$$

In the expression, StdPara represents the standardized evaluation parameter, Para represents the evaluation parameter, Avg represents the average value of the evaluation parameters of pixels belonging to the specific pixel part, a represents the standard deviation of the evaluation parameters of pixels belonging to the specific pixel part, and i represents each pixel belonging to the specific pixel part. Expression (2) below is obtained in a case where the evaluation parameter is the difference value.

$$StdDiff_i=(Diff_i-Avg_i)/\sigma_i \quad (2)$$

In the expression, StdDiff represents the standardized difference value, and Diff represents the difference value.

As illustrated in FIG. 8, the standardized evaluation parameter acquisition unit 43 expands the range of the difference value in a region where the pixel luminance is low through standardization. Thus, the noise level can be made equivalent for threshold values SL3 and SL4 of a region where the pixel luminance is low and a region where the pixel luminance is high. Moreover, through standardization, characteristic points significantly deviating from the average value, such as luminance with defects, are enhanced more. Accordingly, the accuracy of detection of defects and the like can be improved.

Processed Image

Figure 9:
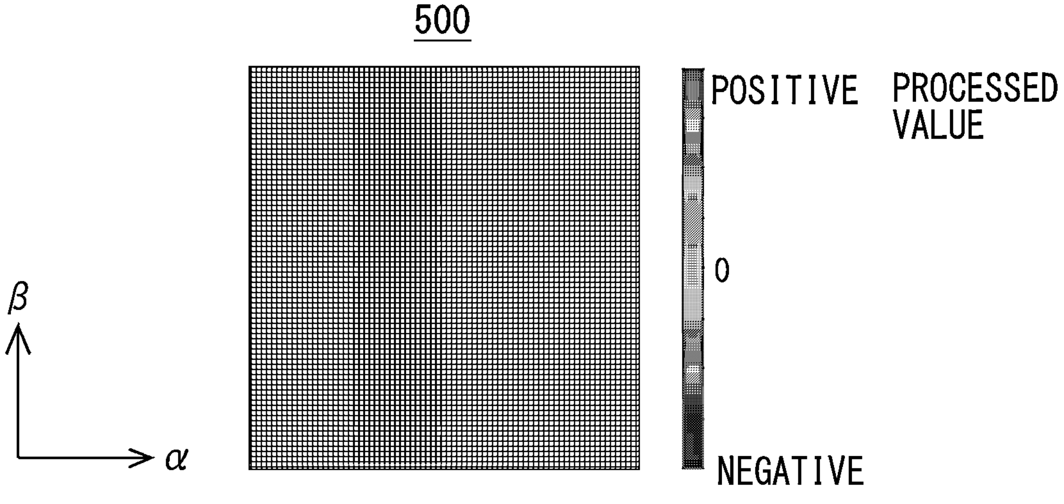
FIG. 9 is a plan view exemplarily illustrating a processed image that is processed by the image processing apparatus according to Embodiment 1.

FIG. 9 is a plan view exemplarily illustrating a processed image 500 that is processed by the image processing apparatus 40 according to Embodiment 1. As illustrated in FIG. 9, the processed image 500 includes a plurality of pixels arrayed in a matrix, for example. The processed image 500 may correspond to the reference image 100, the evaluation image 200, the comparison image, the difference image 300, and the standardized image 400. Similarly to the reference image 100, the evaluation image 200, and the other images, the processed image 500 may include a plurality of pixels on L rows arrayed in the α-axis direction and M columns arrayed in the β-axis direction. Each pixel in the processed image 500 has information about the pixel. Each pixel in the processed image 500 has, as the information about the pixel, a processed value obtained based on the standardized evaluation parameter of each pixel in the standardized image 400 and the evaluation parameter of each pixel in the comparison image.

Since the processed image 500 corresponds to the reference image 100, the evaluation image 200, the comparison image, and the standardized image 400, for example, the plurality of pixels included in the processed image 500 may correspond to the plurality of pixels included in the reference image 100, the evaluation image 200, the comparison image, and the standardized image 400. Note that the processed image may be a virtual image for convenience of description of processing for inspecting an image capturing target specimen from the evaluation image 200 and processing for correcting the evaluation image 200, and it is not essential that the processed image is displayed on a display apparatus or the like, nor that the processed image is generated as an image. Thus, the information (processed values) about the pixels included in the processed image are also simply referred to mean "processed values obtained by arithmetically processing the evaluation parameters based on the standardized evaluation parameters" or referred to mean "processed values obtained by arithmetically processing the evaluation parameters for the plurality of pixels included in the evaluation image 200 by using the standardized evaluation parameters (processed values obtained by arithmetically processing the evaluation parameters for evaluating the information about the plurality of pixels included in the evaluation image 200, by using the standardized evaluation parameter)".

Processing Unit

The processing unit 44 acquires the processed value as the information about each pixel of the plurality of pixels included in the processed image 500 corresponding to the standardized image 400 and the comparison image based on the standardized evaluation parameter of each pixel in the standardized image 400 and the evaluation parameter of each pixel in the comparison image. Specifically, the processing unit 44 acquires the processed value of each pixel in the processed image 500 based on the standardized difference value of each pixel in the standardized image 400 and the difference value of each pixel in the difference image 300.

Figure 10:
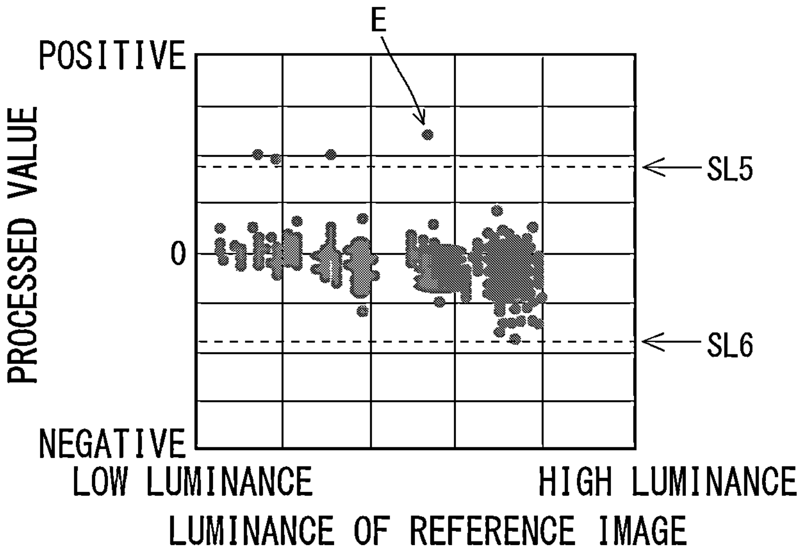
FIG. 10 is a graph exemplarily illustrating the relation between pixel information and a processed value in the image processing apparatus according to Embodiment 1, with the horizontal axis representing the pixel luminance of the reference image and the vertical axis representing the processed value.

FIG. 10 is a graph exemplarily illustrating the relation between the pixel information and the processed value in the image processing apparatus 40 according to Embodiment 1, with the horizontal axis representing the pixel luminance of the reference image 100 and the vertical axis representing the processed value. As illustrated in FIG. 10, the processing unit 44 acquires the processed value based on Expression (3) below. Note that SL5 and SL6 are predetermined threshold values.

$$CXi=Parai\times|ParaStdi| \quad (3)$$

In the expression, CX represents the processed value. Expression (4) below is obtained in a case where the evaluation parameter is the difference value.

$$CXi = Diffi \times |StdDiffi| \tag{4}$$

As illustrated in FIG. 10, the processing unit 44 can reduce the processed value in a luminance range where the noise level is high and the evaluation parameter significantly varies. Moreover, characteristic points significantly distant from the average value, such as luminance with defects can be further enhanced.

Evaluation Unit

The evaluation unit 45 evaluates the standardized evaluation parameter of each pixel in the standardized image 400. In other words, the evaluation unit 45 may evaluate the standardized evaluation parameter for evaluating the information about each pixel in the evaluation image 200. In addition, the evaluation unit 45 evaluates the processed value of each pixel in the processed image 500. In other words, the evaluation unit 45 may evaluate the processed value for evaluating the information about each pixel in the evaluation image 200. Note that the evaluation unit 45 may perform at least one of evaluation of error existence for the standardized image 400 (evaluation image 200) by comparison between the standardized evaluation parameter and a predetermined threshold value, evaluation of, for each pixel, a correction aspect for image correction to be performed on the evaluation image 200 based on the standardized evaluation parameter, and evaluation of error existence for a corrected image obtained by correcting the evaluation image 200 based on the standardized evaluation parameter. Error includes, for example, a specimen defect. Evaluation of the correction aspect for image correction may include evaluation of each pixel for determining how the evaluation image 200 or pixels in it should be corrected based on the standardized evaluation parameter.

Review Apparatus

Figure 11:
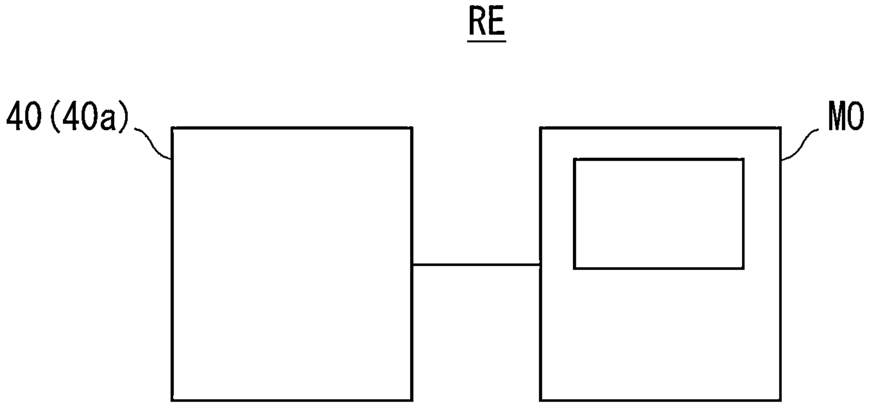
FIG. 11 is a configuration diagram exemplarily illustrating a review apparatus to which the image processing apparatus according to Embodiment 1 is applied.

A review apparatus to which the image processing apparatus 40 is applied will be described below. FIG. 11 is a configuration diagram exemplarily illustrating a review apparatus RE to which the image processing apparatus 40 according to Embodiment 1 is applied. As illustrated in FIG. 11, the review apparatus RE includes the image processing apparatus 40 or 40*a* and a monitor MO. The monitor MO reviews the reference image 100, the evaluation image 200, the comparison image, the standardized image 400, and the processed image 500. The review apparatus RE includes an image correction apparatus, an inspection apparatus, and a storage apparatus and performs image correction, specimen image acquisition, specimen inspection, image storage, and the like. As described above, it is not essential that the comparison image, the standardized image 400, and the processed image 500 are actually generated as images. Thus, the review apparatus RE may not review the comparison image, the standardized image 400, and the processed image 500.

Image Processing Method

Figure 12:
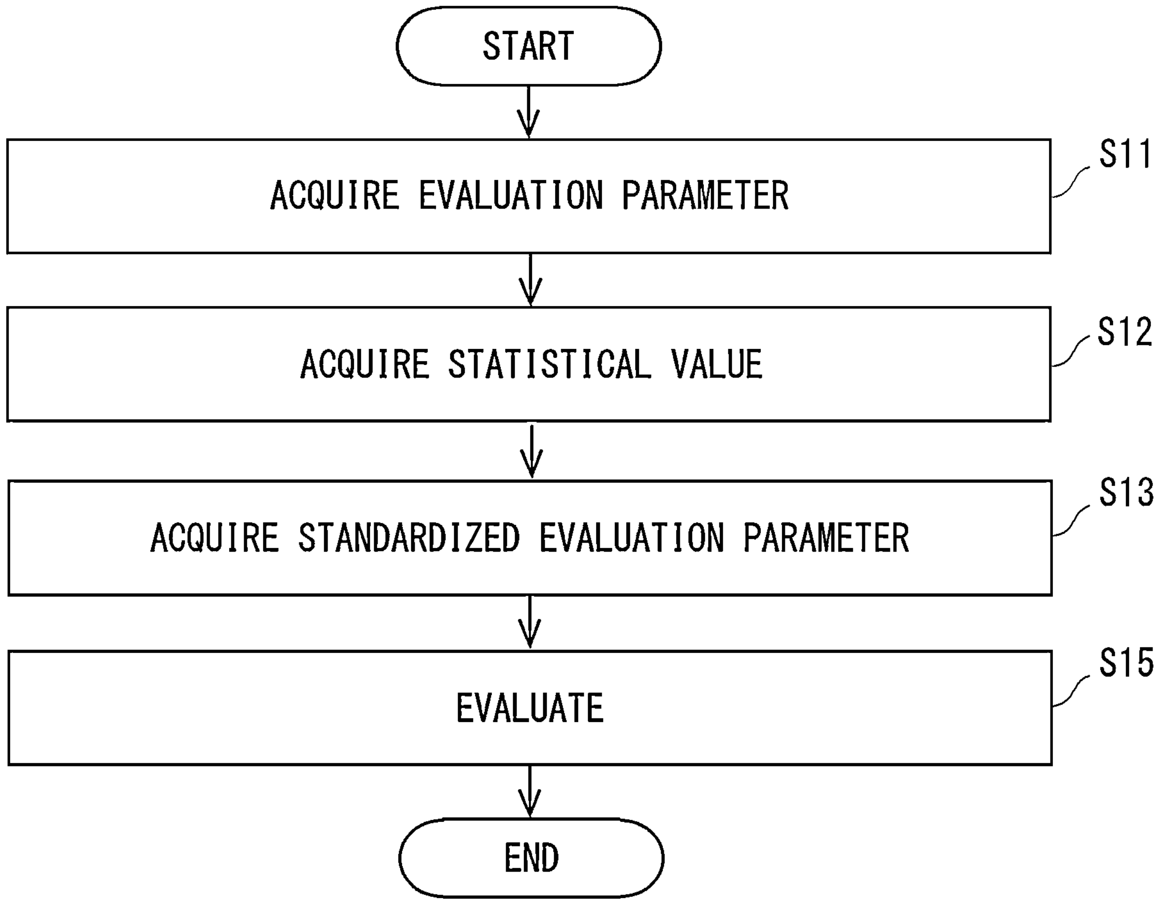
FIG. 12 is a flowchart diagram exemplarily illustrating an image processing method using the image processing apparatus according to Embodiment 1.
Figure 13:
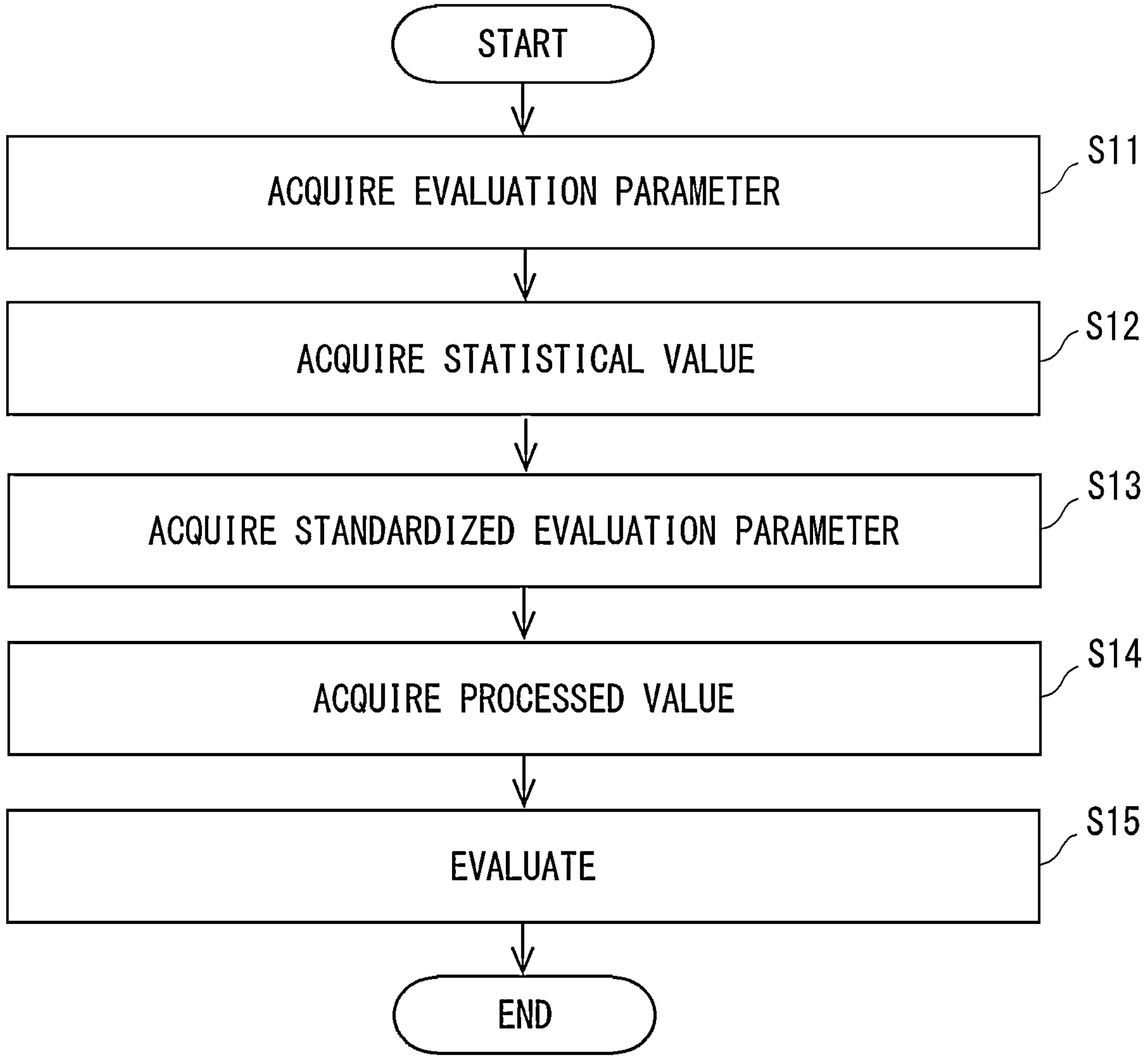
FIG. 13 is a flowchart diagram exemplarily illustrating the image processing method using an image processing apparatus according to another example of Embodiment 1.

An image processing method using the image processing apparatus 40 in the present embodiment will be described below. FIG. 12 is a flowchart diagram exemplarily illustrating the image processing method using the image processing apparatus 40 according to Embodiment 1. FIG. 13 is a flowchart diagram exemplarily illustrating an image processing method using the image processing apparatus 40*a* according to another example of Embodiment 1.

As illustrated in step S11 in FIGS. 12 and 13, the evaluation parameter acquisition unit 41 acquires the evaluation parameter. Specifically, the evaluation parameter acquisition unit 41 acquires the evaluation parameter based on the information about each pixel of the plurality of pixels included in the reference image 100 and the information about each pixel of the plurality of pixels included in the evaluation image 200, the evaluation parameter being acquired as the information about each pixel of the plurality of pixels included in the comparison image. Note that the comparison image may be the difference image 300, and the evaluation parameter may be the difference value. Thus, in step S11, the evaluation parameter acquisition unit 41 may acquire the difference value as the evaluation parameter of each pixel in the difference image 300 as the comparison image by comparison between the luminance of each pixel in the reference image 100 and the luminance of each pixel in the evaluation image 200. Note that the evaluation parameter may be used for evaluating information about pixel in the evaluation image 200. In other words, each evaluation parameter, which is information about each pixel in the comparison image, may be used to evaluate information about the corresponding pixel in the evaluation image 200.

Subsequently, as illustrated in step S12, the statistical value acquisition unit 42 acquires the statistical value. Specifically, the statistical value acquisition unit 42 acquires the statistical value of the evaluation parameters for a plurality of predetermined specific pixels in the comparison image (or the evaluation image 200). The specific pixels in the comparison image or the evaluation image 200 include at least one pixel among pixels corresponding to pixels whose luminance in the reference image 100 belongs to a specific luminance range and pixels corresponding to pixels whose luminance in the evaluation image 200 belongs to the specific luminance range. Note that the statistical value acquisition unit 42 may acquire the statistical value of the difference values for a plurality of predetermined pixels in the difference image 300.

In step S12, the statistical value acquisition unit 42 may acquire the specific statistical value, which is the statistical value of the evaluation parameters for the specific pixels including pixels belonging to the specific luminance range. Moreover, the statistical value acquisition unit 42 may divide the specific luminance range into a plurality of luminance range parts and divide the specific pixels into a plurality of specific pixel parts belonging to the respective luminance range parts. Accordingly, the statistical value acquisition unit 42 may acquire, for each specific pixel part, each specific statistical value part that is the statistical value of the evaluation parameters for each specific pixel part.

Subsequently, as illustrated in step S13, the standardized evaluation parameter acquisition unit 43 acquires the standardized evaluation parameter. Specifically, the standardized evaluation parameter acquisition unit 43 acquires the standardized evaluation parameter by standardizing the evaluation parameter of each pixel of the plurality of pixels included in the comparison image based on the statistical value, the standardized evaluation parameter being acquired as the information about each pixel of the plurality of pixels included in the standardized image 400.

In step S13, the standardized evaluation parameter acquisition unit 43 may acquire the standardized evaluation parameter by standardizing the evaluation parameter of each specific pixel based on the specific statistical value belonging to a specific luminance range. The standardized evaluation parameter acquisition unit 43 may acquire the standardized evaluation parameter as the information about each pixel corresponding to a pixel in the specific pixel part by standardizing the evaluation parameter of the specific pixel part based on the specific statistical value part of the specific pixel part.

Subsequently, as illustrated in step S14 in FIG. 13, the processing unit 44 may acquire the processed value as the information about each pixel of the plurality of pixels included in the processed image 500 based on the standardized evaluation parameter of each pixel in the standardized image 400 and the evaluation parameter of each pixel in the comparison image.

Subsequently, as illustrated in step S15, the evaluation unit 45 may evaluate the standardized evaluation parameter of each pixel in the standardized image 400 or may evaluate the processed value of each pixel in the processed image 500.

In step S15, the evaluation unit 45 may perform at least one of evaluation of error existence in the standardized image 400 by comparison between the standardized evaluation parameter and a predetermined threshold value, evaluation of, for each pixel, a correction aspect to be performed on the evaluation image 200 based on the standardized evaluation parameter, and evaluation of error existence in a corrected image obtained by correcting the evaluation image 200 based on the standardized evaluation parameter.

Review Method

Figure 14:
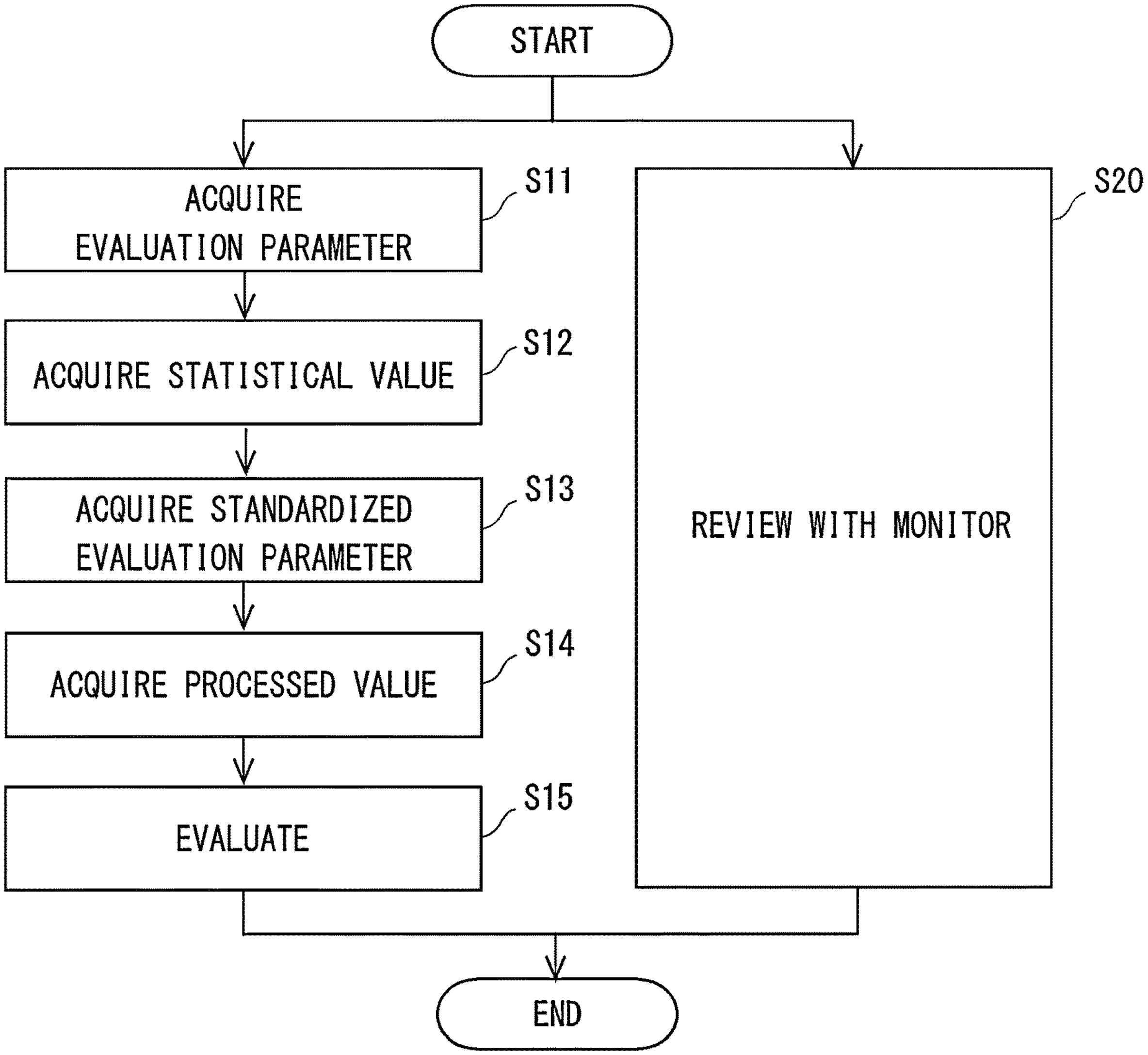
FIG. 14 is a flowchart diagram exemplarily illustrating a review method using the image processing method according to Embodiment 1.

A review method to which the image processing method of the present embodiment is applied will be described below. FIG. 14 is a flowchart diagram exemplarily illustrating a review method using the image processing method according to Embodiment 1. As illustrated in FIG. 14, the review method includes step S20 of reviewing the reference image 100, the evaluation image 200, the comparison image, and the standardized image 400 with the monitor MO in addition to the above-described image processing method. Note that the review method may include the image processing method and an inspection method of inspecting a subject specimen in the evaluation image 200.

Effects of the present embodiment will be described below. In the image processing apparatus 40 of the present embodiment, the standardized evaluation parameter acquisition unit 43 acquires the standardized evaluation parameter as the information about each pixel in the standardized image 400 by dividing the evaluation parameter of the pixel in the comparison image by the standard deviation for each luminance of the reference image 100 or the like. Accordingly, the standardized evaluation parameter is amplified in regions with lower noise levels so that variance of the standardized evaluation parameter for each luminance can be flattened. Thus, highly accurate image processing can be performed For example, the difference value as a pseudo-defect due to defocus is approximately the same as the noise level at each luminance of the reference image 100. Thus, the difference value of the pseudo-defect becomes smaller in the standardized image 400, making it more difficult to detect. For the same reason, a pseudo-defect due to film surface change (reflectance change) can be made more difficult to detect.

By applying a threshold value to the processed image 500, both the standardized image 400 and the comparison image can be evaluated with one threshold value, and thus the accuracy of evaluating actual defects and pseudo-defects can be improved.

Embodiment 2

The image processing apparatus 40 according to Embodiment 2 will be described below. In the present embodiment, an image capturing target specimen has a pattern. For example, in a specimen having patterns including an absorber and a multilayer, the luminance of pixels corresponding to the absorber changes as the reflectance of the absorber changes. Accordingly, the difference value of any pixel corresponding to the absorber in the difference image 300 varies in some cases. In a case where the luminance of any pixel corresponding to the absorber is adjusted to maintain constant, the luminance of the multilayer changes. In either case, pseudo-defects due to change in the luminance of the absorber or the multilayer may be detected in the difference image 300. Furthermore, it is expected that in a case where there are patterns of the absorber and the multilayer in the same specific luminance range, standardization may not properly reflected. Thus, in the present embodiment, standardization is separately performed for regions partitioned based on patterns such as absorbers and multilayers.

Figure 15:
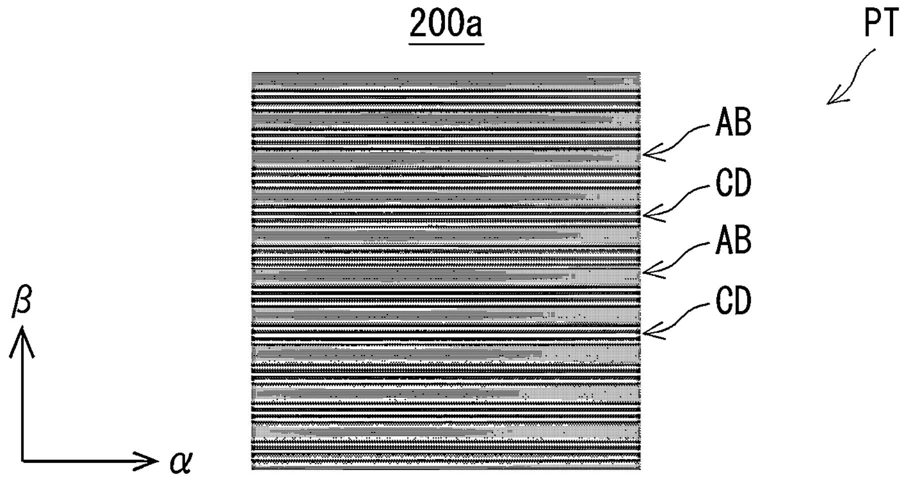
FIG. 15 is a diagram exemplarily illustrating the evaluation image processed by an image processing apparatus according to Embodiment 2.

FIG. 15 is a diagram exemplarily illustrating an evaluation image 200*a* processed by the image processing apparatus 40 according to Embodiment 2. As illustrated in FIG. 15, the evaluation image 200*a* includes an image of a specimen having a pattern PT including regions AB of absorbers and regions CD other than absorbers. Note that the regions AB of absorbers and the regions CD other than absorbers are an example of the pattern PT. Note that the pattern PT may be partitioned based on other properties and there is no upper limit for the number of kinds of the pattern PT partitioned in the specimen. Thus, specific region parts to be described later may be determined for each type of the pattern PT with the number of divisions in accordance with the number of types. In FIG. 15, some reference signs are omitted to avoid complication of the diagram. Each region AB in the pattern PT includes, for example, a blanket film of an absorber formed on the specimen. Note that the pattern PT is not limited to a blanket film of an absorber formed on the specimen but may include corner parts of the blanket film. Note that the reference image 100 may include an image of the specimen having the pattern PT including the regions AB of absorbers and the regions CD other than absorbers. Specifically, at least one of the reference image 100 and the evaluation image 200*a* may include an image of the specimen having the pattern PT.

Figure 16:
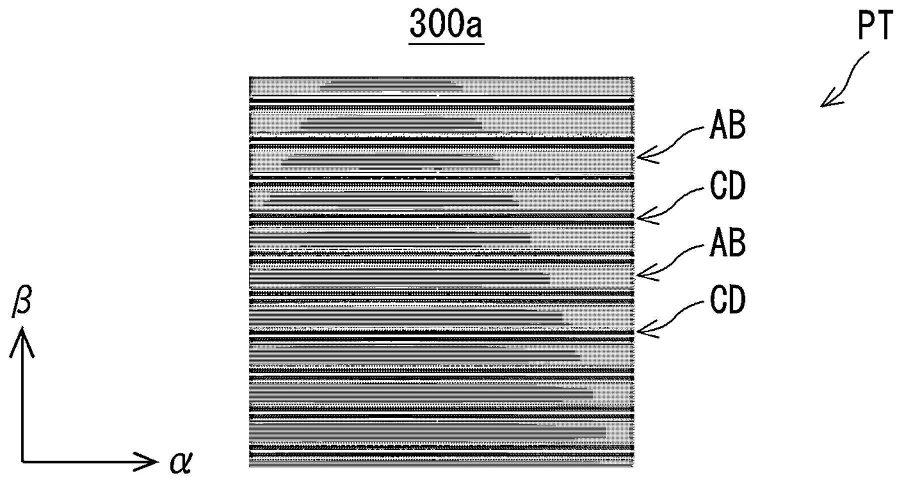
FIG. 16 is a diagram exemplarily illustrating the difference image as the comparison image processed by the image processing apparatus according to Embodiment 2.

FIG. 16 is a diagram exemplarily illustrating a difference image 300*a* as the comparison image processed by the image processing apparatus 40 according to Embodiment 2. As illustrated in FIG. 16, the difference image 300 includes an image reflecting a pattern PT including regions AB of absorbers and regions CD other than absorbers.

Figure 17:
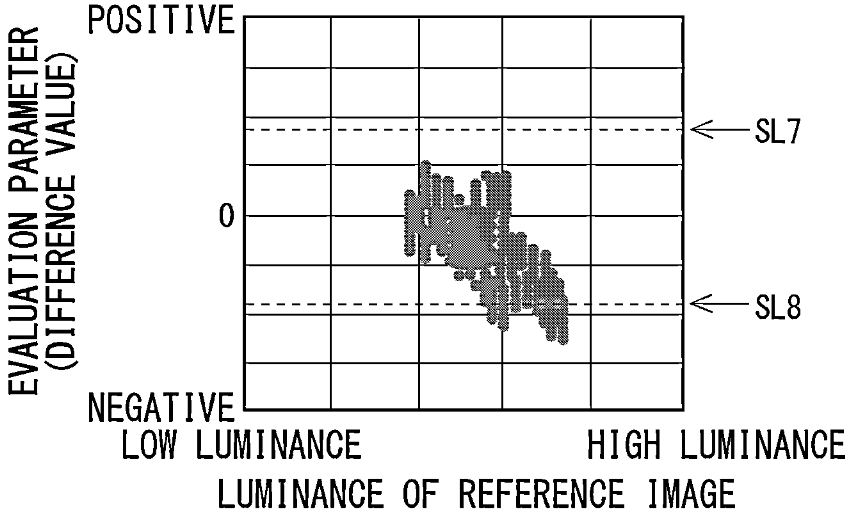
FIG. 17 is a graph exemplarily illustrating the relation between pixel information and the evaluation parameter in the image processing apparatus according to Embodiment 2, with the horizontal axis representing the luminance of the reference image and the vertical axis representing the difference value.
Figure 18:
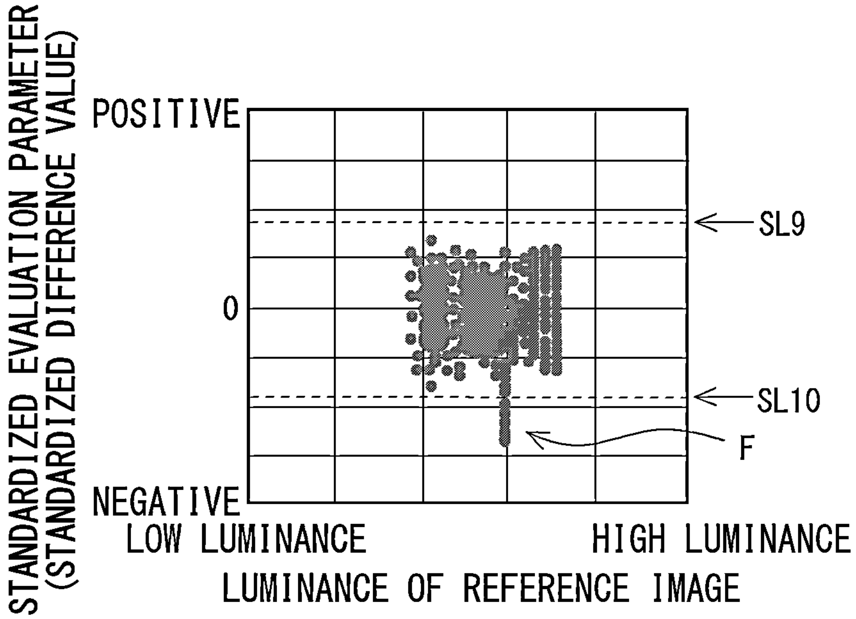
FIG. 18 is a graph exemplarily illustrating the relation between pixel information and the standardized evaluation parameter in the image processing apparatus according to Embodiment 2, with the horizontal axis representing the luminance of the reference image and the vertical axis representing the standardized difference value.

FIG. 17 is a graph exemplarily illustrating the relation between the pixel information and the evaluation parameter in the image processing apparatus 40 according to Embodiment 2, with the horizontal axis representing the luminance of the reference image 100 and the vertical axis representing the difference value. FIG. 18 is a graph exemplarily illustrating the relation between the pixel information and the standardized evaluation parameter in the image processing apparatus 40 according to Embodiment 2, with the horizontal axis representing the pixel luminance of the reference image 100 and the vertical axis representing the standardized difference value. In FIGS. 17 and 18, SL7 to SL10 indicate predetermined threshold values.

As illustrated in FIG. 18, a pseudo-defect F occurs in the standardized image 400 in the present embodiment. This is thought to be because standardization cannot be properly reflected due to the pattern PT of the regions AB and CD, where the different values arise differently (that is, the variability of the difference values differs) within the same luminance range, as described above.

Thus, the statistical value acquisition unit 42 acquires a statistical value of specific regions partitioned based on the pattern PT. In the present embodiment, specific pixels include at least one pixel among pixels corresponding to pixels belonging to the specific regions partitioned based on the pattern PT of the reference image 100 and pixels corresponding to pixels belonging to the specific regions partitioned based on the pattern PT of the evaluation image 200. The specific regions include the pattern PT in the reference image 100, the evaluation image 200, and the difference image 300. The specific pixels include pixels belonging to the pattern PT.

Accordingly, the statistical value acquisition unit 42 acquires the specific statistical value of the evaluation parameter for the specific pixels including pixels belonging to the specific regions. The standardized evaluation parameter acquisition unit 43 acquires the standardized evaluation parameter by standardizing the evaluation parameters based on the specific statistical value.

The statistical value acquisition unit 42 divides the specific regions including the pattern PT into a plurality of specific region parts. The specific region parts may be, for example, the regions AB of absorbers or the regions CD other than absorbers. Alternatively, the specific region parts may be corner parts of absorbers or parts other than corners of absorbers.

The statistical value acquisition unit 42 also divides the specific pixels into a plurality of specific pixel parts belonging to the respective specific region parts. The specific pixel parts may be pixels belonging to the regions AB of absorbers in a specific luminance range or may be pixels belonging to the regions CD other than absorbers in the specific luminance range. Alternatively, the specific pixel parts may be pixels belonging to corners of absorbers in the specific luminance range or may be pixel belonging to parts other than corners of absorbers in the specific luminance range. Note that the specific luminance range may be divided into a plurality of luminance range parts as described above.

Accordingly, the statistical value acquisition unit 42 acquires, for each specific pixel part, a specific statistical value part that is the statistical value of the evaluation parameters for the specific pixel part. The standardized evaluation parameter acquisition unit 43 acquires the standardized evaluation parameter by standardizing the evaluation parameter of each specific pixel part based on the specific statistical value part. The standardized evaluation parameter is information about the pixel in the standardized image 400.

Figure 19:
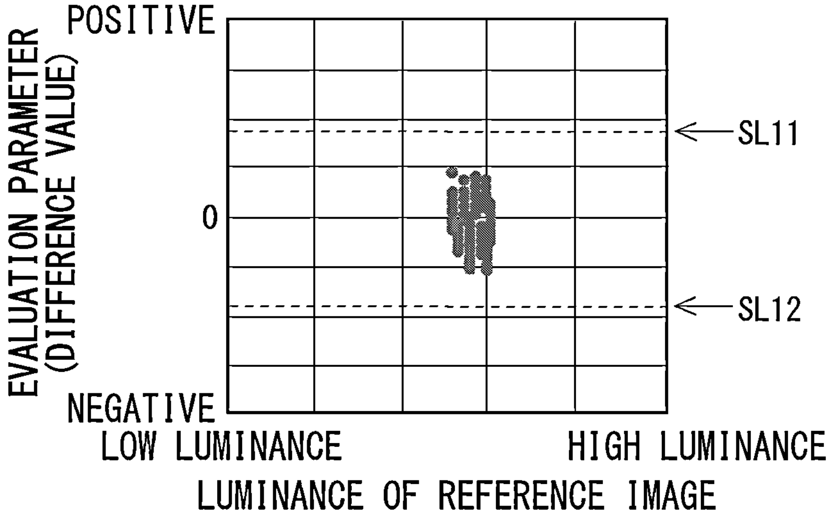
FIG. 19 is a graph exemplarily illustrating the relation between information about specific pixel parts belonging to regions of absorbers and the evaluation parameter in the image processing apparatus according to Embodiment 2, with the horizontal axis representing the pixel luminance of the reference image and the vertical axis representing the difference value.
Figure 20:
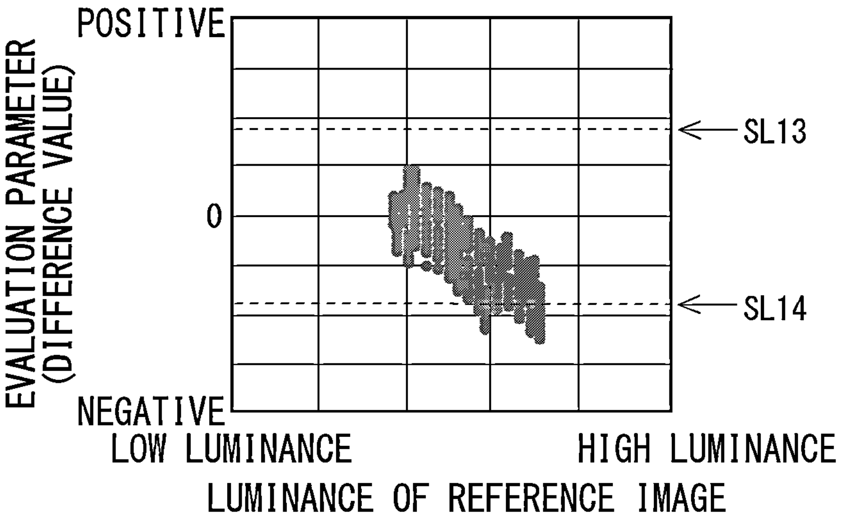
FIG. 20 is a graph exemplarily illustrating the relation between information about specific pixel parts belonging to regions other than absorbers and the evaluation parameter in the image processing apparatus according to Embodiment 2, with the horizontal axis representing the pixel luminance of the reference image and the vertical axis representing the difference value.

A specific example will be described below. The specific regions in the difference image 300*a* are regions having the pattern PT including the regions AB of absorbers and the regions CD other than absorbers. The specific pixels include pixels belonging to the regions having the pattern PT including the regions AB of absorbers and the regions CD other than absorbers. The specific region parts obtained by dividing the specific regions include the regions AB of absorbers and the regions CD other than absorbers. The specific pixel parts include pixels belonging to the regions AB of absorbers and pixels belonging to the regions CD other than absorbers FIGS. 19 and 20 are graphs exemplarily illustrating the relation between the pixel information and the evaluation parameter for the specific pixel parts in the image processing apparatus 40 according to Embodiment 2, with the horizontal axis representing the pixel luminance of the reference image 100 and the vertical axis representing the difference value. FIG. 19 illustrates the difference value of each pixel in a case where the specific pixel parts are pixels belonging to the regions AB of absorbers, and FIG. 20 illustrates the difference value of each pixel in a case where the specific pixel parts are pixels belonging to the regions CD other than absorbers.

Figure 21:
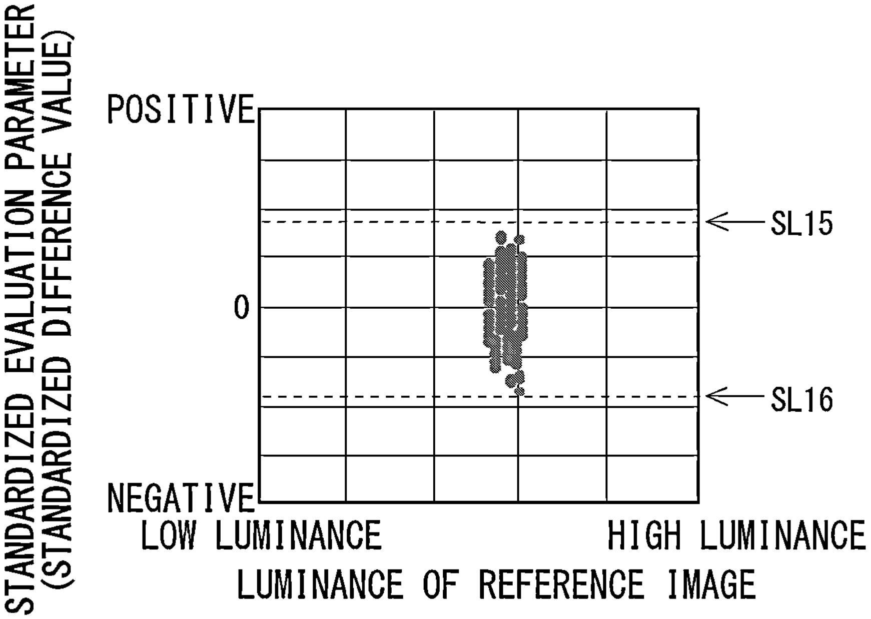
FIG. 21 is a graph exemplarily illustrating the relation between information about specific pixel parts belonging to regions of absorbers and the standardized evaluation parameter in the image processing apparatus according to Embodiment 2, with the horizontal axis representing the pixel luminance of the reference image and the vertical axis representing the standardized difference value.
Figure 22:
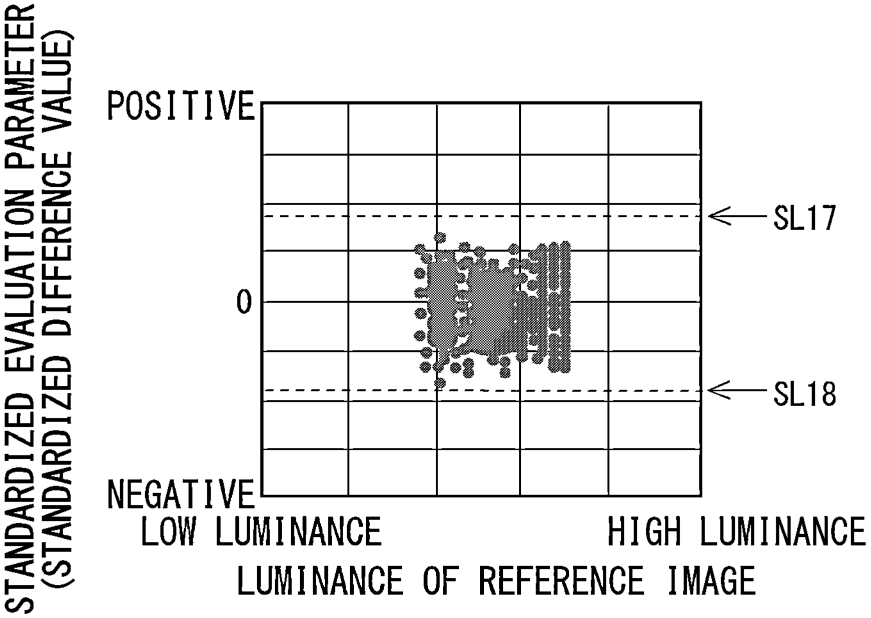
FIG. 22 is a graph exemplarily illustrating the relation between information about specific pixel parts belonging to regions other than absorbers and the standardized evaluation parameter in the image processing apparatus according to Embodiment 2, with the horizontal axis representing the pixel luminance of the reference image and the vertical axis representing the standardized difference value.
Figure 23:
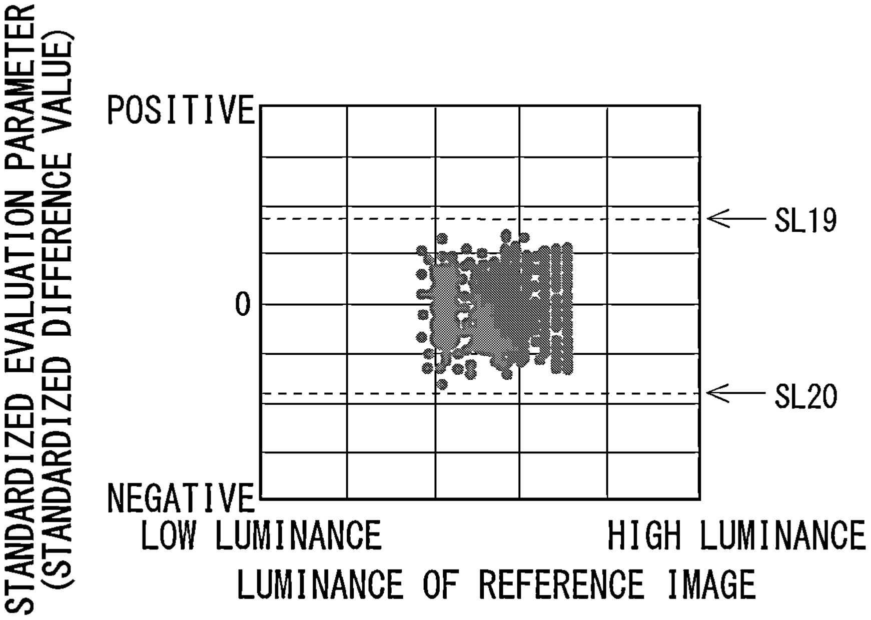
FIG. 23 is a graph exemplarily illustrating the relation between information about specific pixels and the standardized evaluation parameter in the image processing apparatus according to Embodiment 2, with the horizontal axis representing the pixel luminance of the reference image and the vertical axis representing the standardized difference value.

FIGS. 21 and 22 are graphs exemplarily illustrating the relation between the pixel information and the standardized evaluation parameter for the specific pixel parts in the image processing apparatus 40 according to Embodiment 2, with the horizontal axis representing the pixel luminance of the reference image and the vertical axis representing the standardized difference value. FIG. 21 illustrates the standardized difference value in a case where the specific pixel parts are pixels belonging to the regions AB of absorbers, and FIG. 22 illustrates the standardized difference value in a case where the specific pixel parts are pixels belonging to the regions CD other than absorbers. FIG. 23 is a graph exemplarily illustrating the relation between the pixel information and the standardized evaluation parameter for the specific pixels in the image processing apparatus 40 according to Embodiment 2, with the horizontal axis representing the pixel luminance of the reference image 100 and the vertical axis representing the standardized difference value. FIG. 23 is a combination of the results in FIGS. 21 and 22. In FIGS. 19 to 23, SL11 to SL20 indicate predetermined threshold values.

As illustrated in FIGS. 21 to 23, occurrence of the pseudo-defect F is suppressed in the standardized image 400 in the present embodiment. This is because the standardized evaluation parameter is acquired separately for the specific pixel parts as pixels belonging to the regions AB of absorbers and the specific pixel parts as pixels belonging to the regions CD other than absorbers. In this manner, in a case where there are regions (the pattern PT of the regions AB and CD) with different variance degrees of the difference value in the same luminance range, standardization is performed for each region. This makes it possible to more excellently evaluate the evaluation image 200 by, for example, suppressing the occurrence of pseudo-defects. Moreover, Embodiments 1 and 2 may be combined as appropriate. Specifically, the standardized evaluation parameter may be acquired separately for specific pixel parts as pixels belonging to first specific region parts (regions AB of absorbers) in a specific luminance range and for specific pixel parts as pixels belonging to second specific region parts (regions CD other than absorbers) in the specific luminance range. The specific luminance range may be further divided into a plurality of luminance range parts. Specifically, the standardized evaluation parameter may be acquired separately for specific pixel parts as pixels belonging to the first specific region parts (regions AB of absorbers) and a first luminance range part, specific pixel parts as pixels belonging to the first specific region parts (regions AB of absorbers) and a second luminance range part, specific pixel parts as pixels belonging to the second specific region parts (regions CD other than absorbers) and the first luminance range part, and specific pixel parts as pixels belonging to the second specific region parts (regions CD other than absorbers) and the second luminance range part. This makes it possible to more excellently evaluate the evaluation image 200 by, for example, suppressing the occurrence of pseudo-defects.

According to the image processing apparatus 40 of the present embodiment, standardization is performed for the evaluation parameter for each specific region part, and thus the accuracy of processing can be improved. Moreover, nuisance occurring in the particular pattern PT, which is not to be detected can be reduced through standardization for each specific region part.

Although embodiments of the present disclosure are described above, the present disclosure also includes appropriate modifications that do not impair objectives and advantages, and is not limited by the above-described embodiments. In addition, combinations of the configurations of Embodiments 1 and 2 are within the scope of the technological concept of the present disclosure. Moreover, the following configurations are also within the ranges of the technological concept of the embodiments.

(Supplementary Note 1)

An image processing method including:

acquiring an evaluation parameter based on information about each pixel of a plurality of pixels included in a reference image and information about each pixel of a plurality of pixels included in an evaluation image corresponding to the reference image, the evaluation parameter being acquired as the information about each pixel of a plurality of pixels included in a comparison image corresponding to the reference image and the evaluation image;

acquiring a statistical value of the evaluation parameter for a plurality of predetermined specific pixels in the comparison image;

acquiring a standardized evaluation parameter by standardizing the evaluation parameter of each pixel of the plurality of pixels included in the comparison image based on the statistical value, the standardized evaluation parameter being acquired as information about each pixel of the plurality of pixels included in a standardized image corresponding to the comparison image; and evaluating the standardized evaluation parameter.

(Supplementary Note 2)

An image processing method including:

acquiring an evaluation parameter based on comparison between a reference image and an evaluation image for evaluating the information about each pixel of the plurality of pixels included in the evaluation image, the comparison being based on information about each pixel of a plurality of pixels included in the reference image and information about each pixel of a plurality of pixels included in the evaluation image corresponding to the reference image;

acquiring a statistical value of the evaluation parameter for a plurality of predetermined specific pixels in the evaluation image;

acquiring a standardized evaluation parameter for the plurality of pixels included in the evaluation image by standardizing the evaluation parameter based on the statistical value; and evaluating the standardized evaluation parameter.

(Supplementary Note 3)

The image processing method according to supplementary note 1 or 2, in which the acquisition of the evaluation parameter acquires, as the evaluation parameter of each pixel, a difference value obtained by comparing luminance of each pixel in the reference image with the luminance of each pixel in the evaluation image.

(Supplementary Note 4)

The image processing method according to supplementary note 1 or 2, in which the specific pixels include at least one pixel among the pixels whose luminance in the reference image belongs to a specific luminance range and the pixels whose luminance in the evaluation image belongs to the specific luminance range.

(Supplementary Note 5)

The image processing method according to supplementary note 4, in which the acquisition of the statistical value acquires a specific statistical value of the evaluation parameter for the specific pixels including the pixels belonging to the luminance range, and the acquisition of the standardized evaluation parameter acquires the standardized evaluation parameter by standardizing the evaluation parameters of the specific pixel based on the specific statistical value.

(Supplementary Note 6)

The image processing method according to supplementary note 4, in which the acquisition of the statistical value divides the luminance range into a plurality of luminance range parts, divides the specific pixels into a plurality of specific pixel parts belonging to the respective luminance range parts, and acquires, for each specific pixel part, a specific statistical value part that is a statistical value of the evaluation parameter for the specific pixel parts, and the acquisition of the standardized evaluation parameter acquires the standardized evaluation parameter for the pixels corresponding to each specific pixel part by standardizing the evaluation parameter of each specific pixel part based on each specific statistical value part.

(Supplementary Note 7)

The image processing method according to supplementary note 1 or 2, in which at least one of the reference image and the evaluation image includes an image of a specimen having a pattern, and the specific pixels include at least one pixel among the pixels belonging to specific regions partitioned based on the pattern in the reference image and the pixels belonging to the specific regions partitioned based on the pattern in the evaluation image.

(Supplementary Note 8)

The image processing method according to supplementary note 7, in which the acquisition of the statistical value acquires a specific statistical value of the evaluation parameter for the specific pixels corresponding to the pixels belonging to the specific region, and the acquisition of the standardized evaluation parameter acquires the standardized evaluation parameter by standardizing the evaluation parameters of the pixels based on the specific statistical value.

(Supplementary Note 9)

The image processing method according to supplementary note 7, in which the acquisition of the statistical value divides the specific regions into a plurality of specific region parts, divides the specific pixels into a plurality of specific pixel parts belonging to the respective specific region parts, and acquires, for each specific pixel part, a specific statistical value part that is a statistical value of the evaluation parameter for the specific pixel parts, and the acquisition of the standardized evaluation parameter acquires the standardized evaluation parameter for the pixels corresponding to each specific pixel part by standardizing the evaluation parameter of each specific pixel part based on each specific statistical value part.

(Supplementary Note 10)

The image processing method according to supplementary note 1 or 2, in which the evaluation performs at least one of evaluation of error existence for a subject specimen in the evaluation image based on comparison between the standardized evaluation parameter and a predetermined threshold value, evaluation of, for the pixel, a correction aspect to be performed on the evaluation image based on the standardized evaluation parameter, and evaluation of error existence for a corrected image obtained by correcting the evaluation image based on the standardized evaluation parameter.

(Supplementary Note 11)

The image processing method according to supplementary note 1, further including a processing unit configured to acquire a processed value through arithmetic processing based on the standardized evaluation parameter and the evaluation parameter, in which the evaluation unit evaluates the processed value.

(Supplementary Note 12)

An image processing apparatus including:

an evaluation parameter acquisition unit configured to acquire an evaluation parameter based on information about each pixel of a plurality of pixels included in a reference image and information about each pixel of a plurality of pixels included in an evaluation image corresponding to the reference image, the evaluation parameter being acquired as the information about each pixel of a plurality of pixels included in a comparison image corresponding to the reference image and the evaluation image;

a statistical value acquisition unit configured to acquire a statistical value of the evaluation parameter for a plurality of predetermined specific pixels in the comparison image;

a standardized evaluation parameter acquisition unit configured to acquire a standardized evaluation parameter by standardizing the evaluation parameter of each pixel of the plurality of pixels included in the comparison image based on the statistical value, the standardized evaluation parameter being acquired as information about each pixel of the plurality of pixels included in a standardized image corresponding to the comparison image; and an evaluation unit configured to evaluate the standardized evaluation parameter.

(Supplementary Note 13)

An image processing method including:

acquiring an evaluation parameter based on information about each pixel of a plurality of pixels included in a reference image and information about each pixel of a plurality of pixels included in an evaluation image corresponding to the reference image, the evaluation parameter being acquired as the information about each pixel of a plurality of pixels included in a comparison image corresponding to the reference image and the evaluation image;

acquiring a statistical value of the evaluation parameter for a plurality of predetermined specific pixels in the comparison image;

acquiring a standardized evaluation parameter by standardizing the evaluation parameter of each pixel of the plurality of pixels included in the comparison image based on the statistical value, the standardized evaluation parameter being acquired as information about each pixel of the plurality of pixels included in a standardized image corresponding to the comparison image; and evaluating the standardized evaluation parameter.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An image processing apparatus comprising:

an evaluation parameter acquisition unit configured to acquire an evaluation parameter for evaluating the information about each pixel of the plurality of pixels included in an evaluation image, based on comparison between a reference image and the evaluation image, the comparison being based on information about each pixel of a plurality of pixels included in the reference image and information about each pixel of a plurality of pixels included in the evaluation image corresponding to the reference image;

a statistical value acquisition unit configured to acquire a statistical value of the evaluation parameters for a plurality of predetermined specific pixels in the evaluation image;

a standardized evaluation parameter acquisition unit configured to acquire a standardized evaluation parameter for evaluating the information about each pixel of the plurality of pixels included in the evaluation image by standardizing the evaluation parameter based on the statistical value; and an evaluation unit configured to evaluate the standardized evaluation parameter.

2. The image processing apparatus according to claim 1, wherein the evaluation parameter acquisition unit acquires, as the evaluation parameter of each pixel, a difference value obtained by comparing luminance of each pixel in the reference image with the luminance of each pixel in the evaluation image.

3. The image processing apparatus according to claim 1, wherein the specific pixels include at least one pixel among the pixels corresponding to pixels whose luminance in the reference image belongs to a specific luminance range and the pixels corresponding to pixels whose luminance in the evaluation image belongs to the specific luminance range.

4. The image processing apparatus according to claim 3, wherein the statistical value acquisition unit acquires a specific statistical value of the evaluation parameter for the specific pixels corresponding to the pixels belonging to the specific luminance range, and the standardized evaluation parameter acquisition unit acquires the standardized evaluation parameter by standardizing the evaluation parameters of the specific pixels based on the specific statistical value.

5. The image processing apparatus according to claim 3, wherein the statistical value acquisition unit divides the specific luminance range into a plurality of specific luminance range parts, divides the specific pixels into a plurality of specific pixel parts corresponding to the pixel parts belonging to the respective luminance range parts, and acquires, for each specific pixel part, a specific statistical value part that is a statistical value of the evaluation parameter for the specific pixel parts, and the standardized evaluation parameter acquisition unit acquires the standardized evaluation parameter for the pixels corresponding to each specific pixel part by standardizing the evaluation parameter of each specific pixel part based on each specific statistical value part.

6. The image processing apparatus according to claim 1, wherein at least one of the reference image and the evaluation image includes an image of a specimen having a pattern, and the specific pixels include at least one pixel among the pixels corresponding to the pixels belonging to specific regions partitioned based on the pattern in the reference image and the pixels corresponding to the pixels belonging to the specific regions partitioned based on the pattern in the evaluation image.

7. The image processing apparatus according to claim 6, wherein the statistical value acquisition unit acquires a specific statistical value of the evaluation parameter for the specific pixels corresponding to the pixels belonging to the specific regions, and the standardized evaluation parameter acquisition unit acquires the standardized evaluation parameter by standardizing the evaluation parameters of the specific pixels based on the specific statistical value.

8. The image processing apparatus according to claim 6, wherein the statistical value acquisition unit divides the specific regions into a plurality of specific region parts, divides the specific pixels into a plurality of specific pixel parts corresponding to the pixel parts belonging to the respective specific region parts, and acquires, for each specific pixel part, a specific statistical value part that is a statistical value of the evaluation parameter for the specific pixel parts, and the standardized evaluation parameter acquisition unit acquires the standardized evaluation parameter for the pixels corresponding to each specific pixel part by standardizing the evaluation parameter of each specific pixel part based on each specific statistical value part.

9. The image processing apparatus according to claim 1, wherein the evaluation unit performs at least one of evaluation of error existence for a subject specimen in the evaluation image based on comparison between the standardized evaluation parameter and a predetermined threshold value, evaluation of, for the pixel, a correction aspect to be performed on the evaluation image based on the standardized evaluation parameter, and evaluation of error existence for a corrected image obtained by correcting the evaluation image based on the standardized evaluation parameter.

10. The image processing apparatus according to claim 1, further comprising a processing unit configured to acquire a processed value through arithmetic processing based on the standardized evaluation parameter and the evaluation parameter, wherein the evaluation unit evaluates the processed value.

11. An inspection apparatus comprising the image processing apparatus according to claim 1, for a subject specimen in the evaluation image.

12. A review apparatus comprising:

the image processing apparatus according to claim 1; and a monitor for reviewing the reference image, the evaluation image, the comparison image, and the standardized image.

13. An image processing method comprising:

acquiring an evaluation parameter based on comparison between a reference image and an evaluation image for evaluating the information about each pixel of the plurality of pixels included in the evaluation image, the comparison being based on information about each pixel of a plurality of pixels included in the reference image and information about each pixel of a plurality of pixels included in the evaluation image corresponding to the reference image;

acquiring a statistical value of the evaluation parameter for a plurality of predetermined specific pixels in the evaluation image;

acquiring a standardized evaluation parameter for evaluating the information about each pixel of the plurality of pixels included in the evaluation image by standardizing the evaluation parameter based on the statistical value; and evaluating the standardized evaluation parameter.

14. An inspection method comprising the image processing method according to claim 13, for inspecting a subject specimen in the evaluation image.

15. A review method comprising:

the image processing method according to claim 13; and reviewing the reference image, the evaluation image, the comparison image, and the standardized image with a monitor.

* * * * *